(12) United States Patent
Yamaguchi et al.

(10) Patent No.: US 6,710,771 B1
(45) Date of Patent: Mar. 23, 2004

(54) INFORMATION PROCESSING METHOD AND APPARATUS AND MEDIUM

(75) Inventors: Yoshihiro Yamaguchi, Tokyo (JP); Soichi Sato, Tokyo (JP); Jun Suzuki, Tokyo (JP); Tetsuya Kohno, Kanagawa (JP); Tota Hasegawa, Tokyo (JP); Yuichiro Ishii, Tokyo (JP); Yoshifumi Ueno, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/570,005

(22) Filed: May 12, 2000

(30) Foreign Application Priority Data

May 13, 1999 (JP) .......................................... 11-133365
May 13, 1999 (JP) .......................................... 11-133367
May 13, 1999 (JP) .......................................... 11-133368

(51) Int. Cl.[7] ................................................ G09G 5/00
(52) U.S. Cl. ...................... 345/184; 345/169; 345/172; 345/808; 345/810; 345/830; 345/834; 345/902; 345/973
(58) Field of Search ................................. 345/159, 169, 345/339, 348, 352, 353, 703, 710, 712, 808, 819, 830, 184, 705, 834, 156, 168, 172, 810, 785, 684; 455/550.1, 556.2, 572, 574, 566

(56) References Cited

U.S. PATENT DOCUMENTS

| | | | | |
|---|---|---|---|---|
| 5,856,827 A | * | 1/1999 | Sudo ........................... | 345/352 |
| 5,963,195 A | * | 10/1999 | Gregg et al. .................. | 345/159 |
| 6,037,937 A | * | 3/2000 | Beaton et al. ............... | 345/339 |
| 6,049,336 A | * | 4/2000 | Liu et al. ..................... | 345/353 |
| 6,178,338 B1 | * | 1/2001 | Yamagishi et al. ......... | 455/566 |
| 6,188,406 B1 | * | 2/2001 | Fong et al. .................. | 345/348 |
| 6,192,258 B1 | * | 2/2001 | Kamada et al. ............. | 455/566 |
| 6,208,342 B1 | * | 3/2001 | Mugura et al. ............. | 345/339 |
| 6,226,534 B1 | * | 5/2001 | Aizawa ....................... | 455/566 |
| 6,297,795 B1 | * | 10/2001 | Kato et al. ................... | 345/169 |
| 6,392,964 B2 | * | 5/2002 | Koyata et al. ............... | 345/703 |
| 6,483,500 B1 | * | 11/2002 | Choi et al. ................... | 345/184 |
| 6,512,449 B1 | * | 1/2003 | Aizawa ....................... | 345/184 |

\* cited by examiner

*Primary Examiner*—Bipin Shalwala
*Assistant Examiner*—David L. Lewis
(74) *Attorney, Agent, or Firm*—Frommer Lawrence & Haug LLP; William S. Frommer; Dennis M. Smid

(57) ABSTRACT

An information processing method and apparatus free from a defect in a conventional system that complicated processing operations need to be executed before a user selects a desired application program on a task bar equipped with a start menu button and starts the selected program. A jog dial related application declares to a jog dial state monitor program 54C that it (application) itself is a jog dial related application. The jog dial state monitor program 54C then adds the application software to a list of the jog dial related applications. The display of the jog dial menu is then set to a display proper to the application and apprised to the user in the form of a jog dial guide. The jog dial related application advises the illustration of the jog dial operation in the current state to the jog dial state monitor program 54C in the form of a letter string.

8 Claims, 31 Drawing Sheets

RIGHTWARD REVOLUTION

LEFTWARD REVOLUTION

INFORMATION PROCESSING METHOD AND APPARATUS AND MEDIUM

BACKGROUND OF THE INVENTION

1. Field of the Invention

This invention relates to an information processing method and apparatus and a medium. More particularly, it relates to an information processing method and apparatus and a medium in which pre-set processing is adapted to be executed by simple operations employing e.g., a jog dial.

2. Description of Related Art

Recently, a computer operating system, having peripherals, such as mouse, keyboard or a video display, such as Window 95 (registered trademark) or Window 98, registered trademark, produced by MICROSOFT INC. USA, is known. As this operating system, such a system furnishing a task bar for providing a user with a visual cue, such as a button, is now in widespread use. The technology concerning the use of this task bar is disclosed in detail in Japanese Laying-Open Patent H-8-255066.

In the following, description is made by referring to this published reference material. The task bar can be used for furnishing the information on the currently active windows to the user as a visual cue, and for displaying the currently active window. The task bar has a start menu button for enabling user accessing to a menu for controlling the program launching, document opening and system setting.

In a computer system, an example of operating a start menu button on a task bar is hereinafter explained. The start menu button operates as means for opening a start menu operating in turn as a centralized site for the user to access the programs, documents, system setting or the help information. When the user points to the start menu button with a cursor of a mouse and clicks the lest mouse button, the start menu is displayed.

The start menu includes menu items, such as program, retrieval, setting or help. Of these, the program menu item permits accessing from the start menu to the hierarchically displayed program menu. On the program menu are displayed plural application programs and program loops that can be selected by the user.

Meanwhile, a sequence of complicated operations are repeatedly performed until the user selects the application program on a task bar having the above-mentioned start menu button to start the selected application program.

That is, the user first points to the start menu button on a task bar with the mouse cursor to display a start menu. The user then points to the program menu item form the start menu with the mouse cursor and clicks the left mouse button to display the program menu. The user then points to the display of a desired application program on the program menu and clicks the left mouse button. If the application program loop is to be displayed, pointing and clicking operations need to be repeated further. The CPU then starts the desired application program.

In this manner, the user has to perform complex operations repeatedly until the application program desired by the user is started, so that the operating system is difficult to use as a user interface. The same applies for the case of the user clicking a menu item such as "help" from the start menu program to execute the desired processing.

SUMMARY OF THE INVENTION

It is therefore an object of the present invention to provide an information processing method and apparatus and a medium in which desired processing can be executed by simple operations employing e.g., jog dials.

For accomplishing the above object, the present invention provides an information processing apparatus including actuating means having a first actuating portion associated with a rotating operation and a second operating portion associated with movement actuation in one direction, and control means for monitoring the state of the actuating means and for executing a pre-set processing operation in meeting with each actuation. The control means switches an actuating window associated with the actuating means in at least two modes responsive to the state of an application program.

The present invention also provides an information processing method including a controlling step of monitoring the state of actuating means having a first actuating portion associated with a rotating operation and a second operating portion associated with movement actuation in one direction and for executing a pre-set processing operation in meeting with each actuation. The control step switches an actuating window associated with the actuating means in at least two modes responsive to the state of an application program.

The present invention also provides a medium for furnishing a computer-readable program including a controlling step of monitoring the state of actuating means having a first actuating portion associated with a rotating operation and a second operating portion associated with movement actuation in one direction and for executing a pre-set processing operation in meeting with each actuation. The program permits an information processing apparatus to execute processing of displaying an actuating window associated with the actuating means in at least two modes responsive to the state of the application program in a switching fashion by the controlling step.

With the information processing method and apparatus and the medium, according to the present invention, desired processing can be executed from plural menus by simple operations of e.g., a jog dial, whilst the user may be apprised of what can be done at present on actuating the jog dial, thus improving user interface.

It is another object of the present invention to provide an information processing method and apparatus and a medium in which desired processing can be executed by simple operations employing e.g., jog dials, and in which an event setting can be made in agreement with the operations.

For accomplishing this object, the present invention provides an information processing method including a controlling step of monitoring the state of actuating means having a first actuating portion associated with a rotating actuation and a second actuating portion associated with a movement actuation in one direction, executing a pre-set operation responsive to each actuation and for accepting setting for the actuating means.

The present invention also provides an information processing method including a controlling step of monitoring the state of actuating means having a first actuating portion associated with a rotating actuation and a second actuating portion associated with a movement actuation in one direction, executing a pre-set operation responsive to each actuation and for accepting setting for the actuating means.

The present invention also provides a medium for furnishing a program including a controlling step of monitoring the state of actuating means having a first actuating portion associated with a rotating actuation and a second actuating portion associated with a movement actuation in one direction, executing a pre-set operation responsive to each actuation and for accepting setting for the actuating means.

The jog dial is responsive to the rotating actuation indicated by an arrow a in FIG. 3 to execute pre-set processing, while enabling the setting of an event etc in agreement with the actuation.

It is yet another object of the present invention to provide an information processing method and apparatus and a medium in which desired processing can be executed instantaneously by simple operations employing e.g., jog dials.

For accomplishing this object, the present invention provides an information processing apparatus for starting a pre-set application program including actuating means having a first actuating portion associated with a rotating actuation and a second actuating portion associated with a movement actuation in one direction, and control means for automatically starting a previously registered specified application program when the second actuating portion of the actuating means is moved in one direction.

The present invention also provides an information processing method for starting a pre-set application program including a controlling step of automatically starting a previously registered specified application program when a second actuating portion of actuating means having a first actuating portion associated with a rotating actuation and the second actuating portion associated with a movement actuation in one direction is moved in one direction.

The present invention also provides a medium for permitting an information processing apparatus to execute a program including a controlling step of automatic starting a previously registered specified application program when a second actuating portion of actuating means having a first actuating portion associated with a rotating actuation and the second actuating portion associated with a movement actuation in one direction is moved in one direction.

With the information processing method and apparatus according to the present invention, a desired processing operation from plural menus can be executed instantaneously by a simple operation of pressing e.g., a jog dial.

DESCRIPTION OF THE PREFERRED EMBODIMENTS

Figure 1:
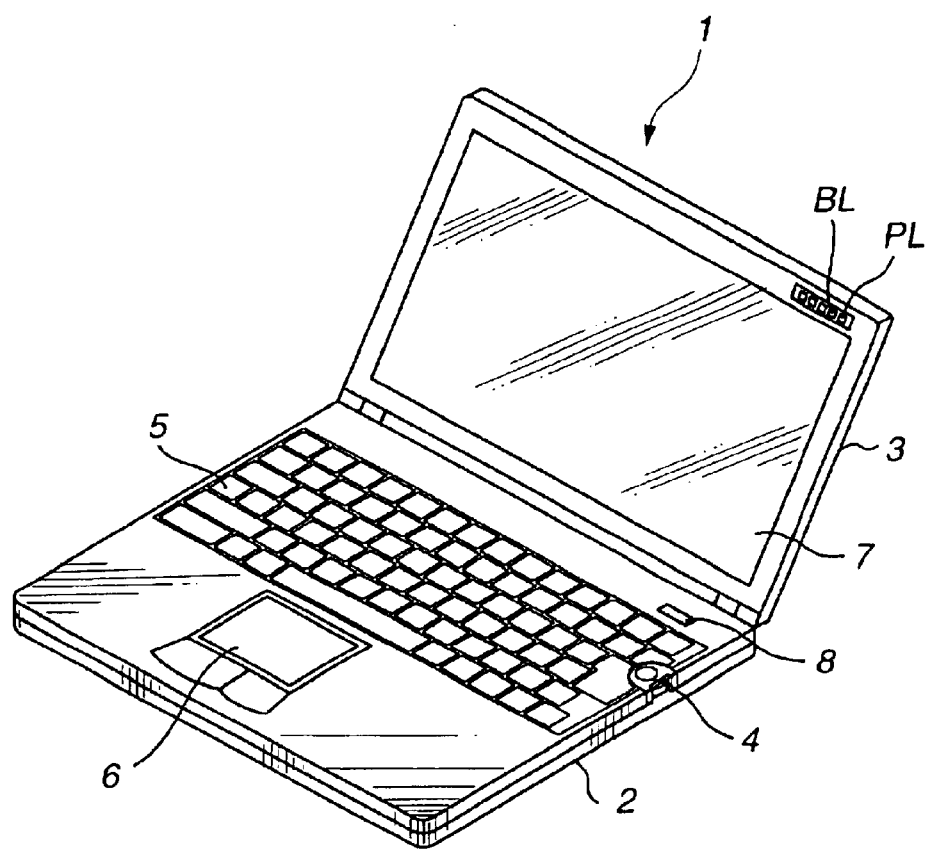
FIG. 1 is a perspective view showing a notebook type personal computer employing the present invention.
Figure 2:
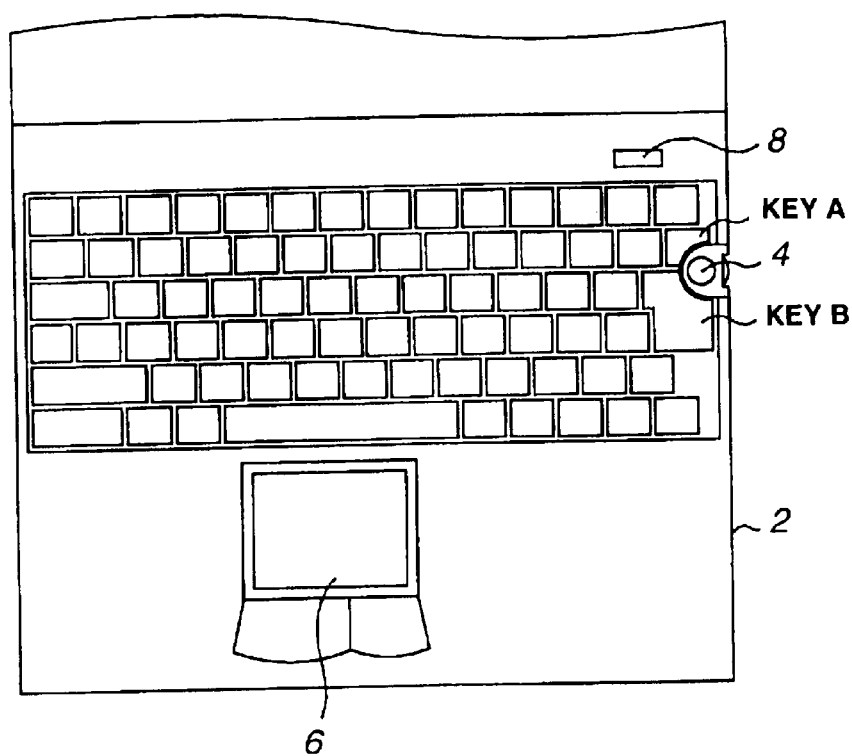
FIG. 2 is a plan view showing a main body portion of the notebook type personal computer shown in FIG. 1
Figure 3:
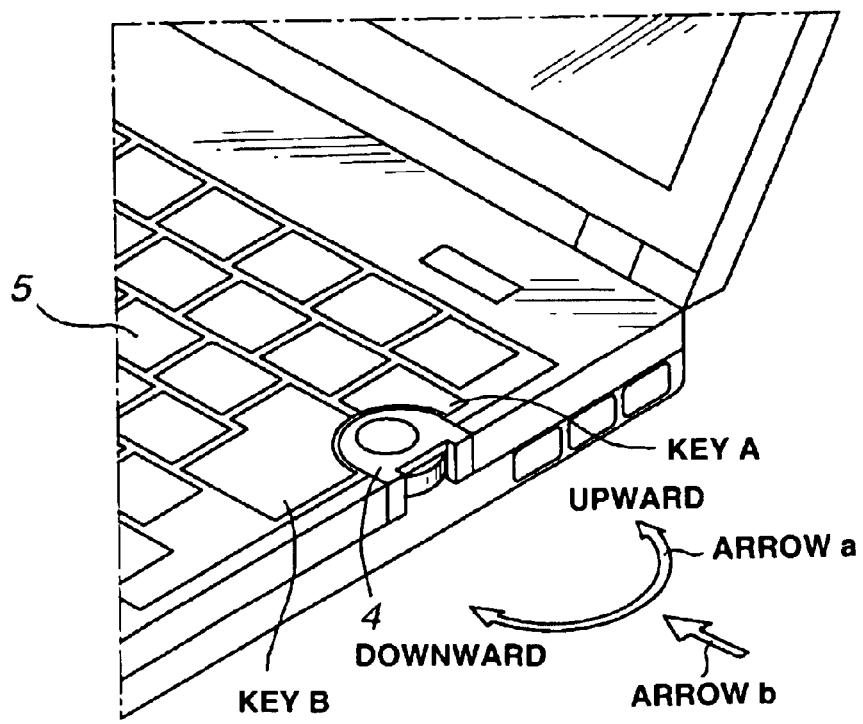
FIG. 3 is an enlarged view of the vicinity of the jog dial constituting an essential portion of the present invention.
Figure 4:
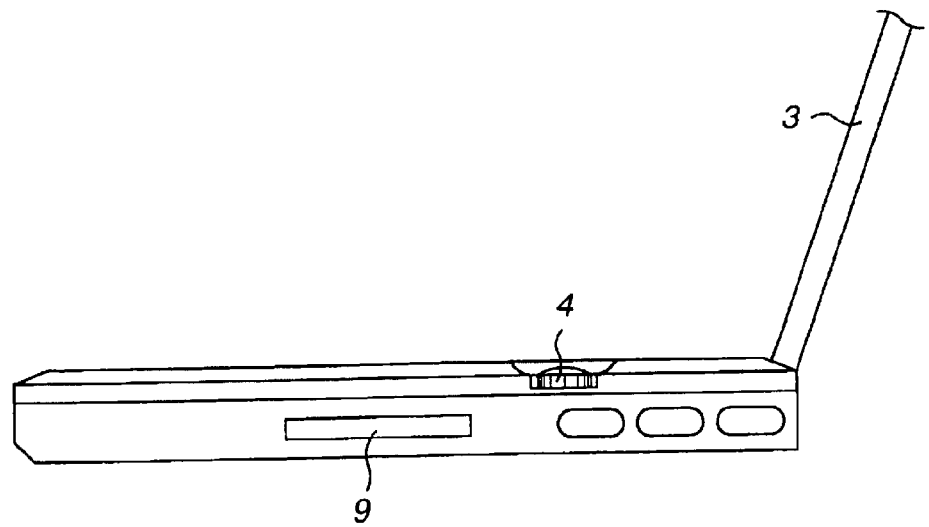
FIG. 4 is a side view of the jog dial side of the main body portion.

Referring to the drawings, preferred embodiments of according to the present invention will be explained in detail. FIGS. 1 to 4 illustrate the appearance of a notebook personal computer 1 as an example of application of the apparatus and the method for processing the information according to the present invention. This notebook personal computer 1 is basically constituted by a main body portion 2 and a display portion 3 that can be opened/closed with respect to this main body portion 2. FIG. 1 shows the appearance of the notebook personal computer 1 with the display portion 3 being opened relative to the main body portion 2. FIG. 2 shows the plan view of the main body portion 2 and FIG. 3 shows an enlarged view the vicinity of a jog dial 4, as later explained, constituting the essential portions of the present invention. FIG. 4 is a side view of the side of the jog dial 4 of the main body portion 2.

On the upper surface of the main body portion 2, there are provided a keyboard 5, acted upon when various letters or symbols are to be inputted, a touch pad 6 as a pointing device acted upon for causing mouse cursor movement, and a power source switch 8.

On the front side of the display portion 3, there is provided an LCD (liquid crystal display) 7 for demonstrating a picture. On the right upper side of the display portion 3, there are provided a power source lamp PL, a battery lamp BL, a message lamp ML and other LED lamps.

Referring to the setting positions of the jog dial 4 in detail, the jog 4 is built in a space between keys A and B (rightmost key) on the keyboard 5 on the main body portion 2, on substantially the same level as the keys A and B.

The jog dial 4 executes pre-set processing responsive to the rotating actuation as indicated by arrow a in FIG. 3, while executing pre-set processing responsive to the movement actuation as indicated by arrow b in FIG. 3. The pre-set processing executed by the jog dial 4 will be explained subsequently.

The structure of this jog dial 4 is first explained. The jog dial 4 is an specified example of a rotation actuating electronic part fitted with a push switch as disclosed in Japanese Laying-Open Patent H-8-203387.

That is, the jog dial 4 includes a rotary encoding unit 12 and a push switch unit 13 on a contact mounting substrate 11. The rotary encoding unit 12 is adapted for being moved in the horizontal direction within a pre-set range, whilst the push switch unit 13 is fixed.

Figure 6:
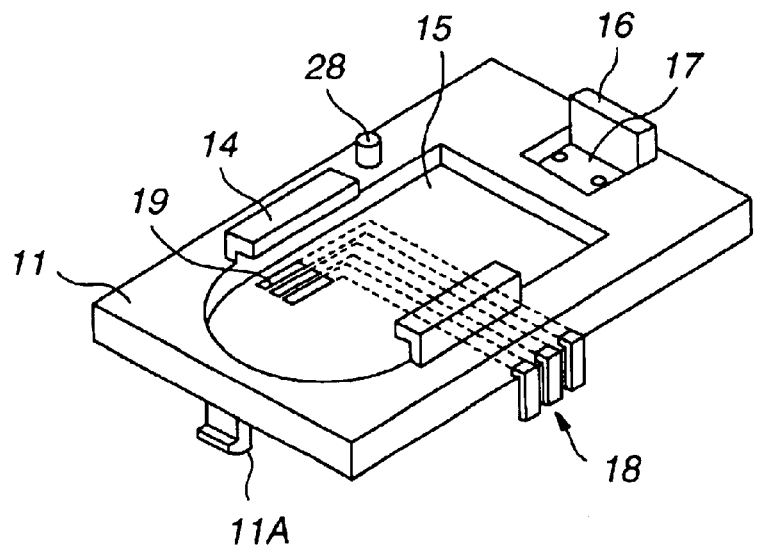
FIG. 6 is a perspective view of a contact mounting substrate constituting an essential portion of the jog dial shown in FIG. 5.

Referring to FIG. 6, the contact mounting substrate 11 includes a contact plate 19 comprising a molded resin member in the form of a flat plate having recesses 15,17 and a terminal 18. The recess 15 has a guide rail 14 for movement of the rotary encoding unit 12, while the recess 17 has a retention wall section 16 for immobilizing the push switch unit 13. The terminal 18 serves for transmitting electrical signals of the rotary encoding unit 12 to outside.

Figure 5:
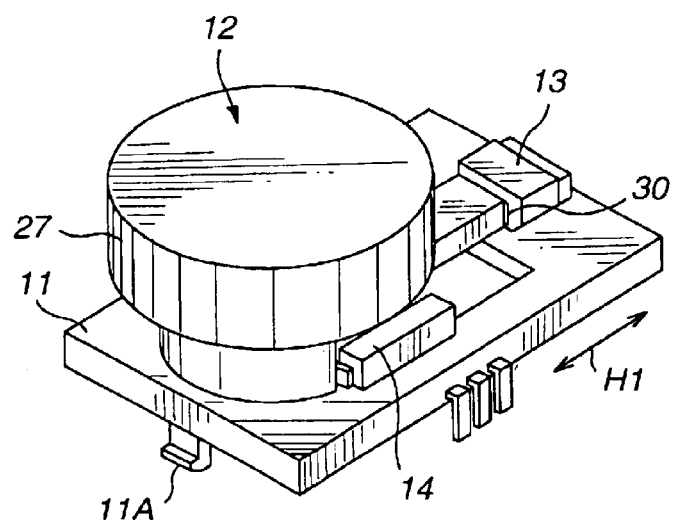
FIG. 5 is a perspective view o the jog dial.
Figure 7:
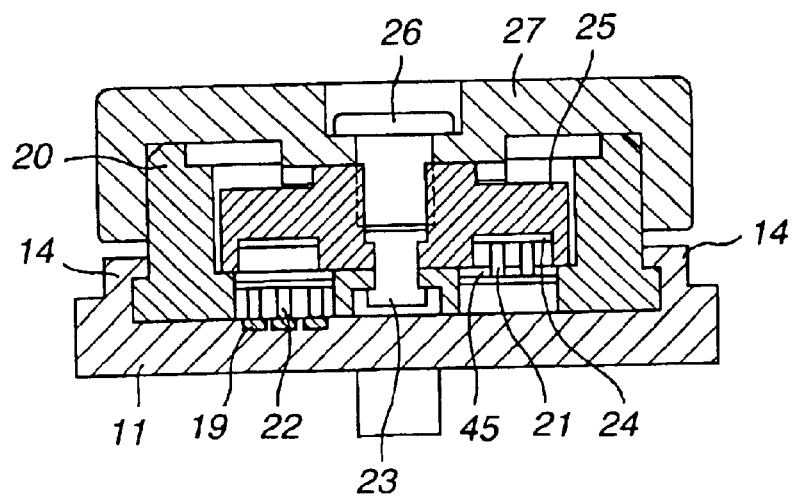
FIG. 7 is a front cross-sectional view of the jog dial.
Figure 8:
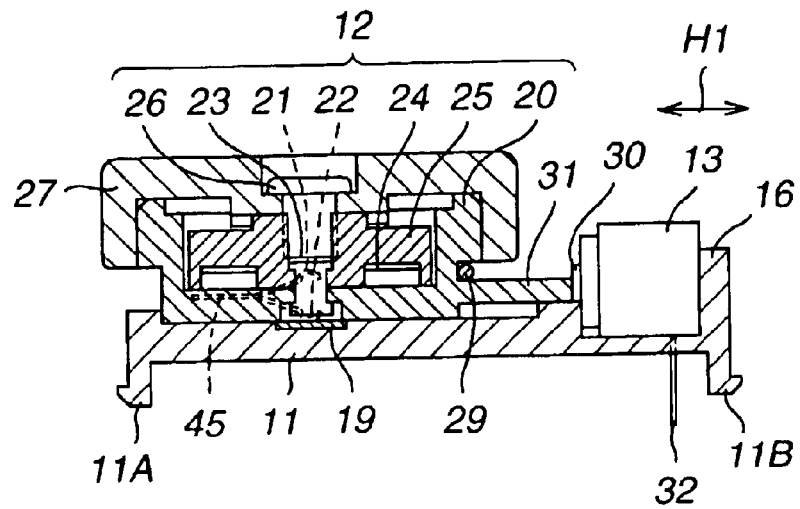
FIG. 8 is a cross-sectional side view of the jog dial.

Referring to FIGS. 7 and 8, the rotary encoding unit 12 includes a box-shaped casing 20 of molded resin fitted in the recess 15 of the contact mounting substrate 11 and retained for movement within a pre-set range in the horizontal direction as indicated by arrow H1 in FIGS. 5 and 8, and elastic contact legs 21, 22 protruded upwards and downwards from an elastic contact member 45 mounted by insert molding on the bottom surface of the box-shaped casing 20. The rotary encoding unit 12 also includes a rotary member 25 of synthetic resin retained for rotational movement by a columnar shaft 23 formed integrally with the mid portion of the box-shaped casing 20 and which includes a disc-shaped radial contact plate 24 on the lower surface of which is elastically contacted the elastic contact leg 21, and a peripheral actuating type circular knob 27 mounted by a screw 26 over the rotary member 25 for rotationally actuating the rotary member 25. With the rotary encoding unit 12, the lateral surface of the box-shaped casing 20 is pushed in the horizontal direction by a torsion coil spring 29 positioned by a pin-shaped projection 28 on the contact mounting substrate 11 (see FIGS. 6 and 10) so that the rotary encoding unit 12 is biased to a position spaced in a normal state apart from the push switch unit 13. Moreover, the elastic contact leg 22, protruded downwards from the bottom surface of the box-shaped casing 20, is in elastic contact with the contact plate 19 of the contact mounting substrate 11.

The push switch unit 13 is secured by fitting in the recess 17 in the contact mounting substrate 11 so that an actuating button 30 faces the rotary encoding unit 12, with the rear end of the button compressing against the retention wall section 16. 19, as shown in FIGS. 5 and 6.

A driving projection 31 formed integrally with the box-shaped casing 20 of the rotary encoding unit 12 compresses against the distal end of the actuating button 30 of the push switch unit 13, as shown in FIG. 8. The foregoing is the structure of the jog dial. When the jog dial is to be mounted on an electronic equipment, legs 11A, 11B on the lower surface of the contact mounting substrate 11, the connection terminal 18 of the rotary encoding unit 12 and a connection terminal 32 of the push switch unit 13 are introduced and soldered in mounting openings 33A, 34B, 35 and 36 of a printed circuit board 33 of the electronic equipment, with the jog dial being mounted in position with the end of the peripheral actuating knob 27 of the rotary encoding unit 12 opposite to the push switch unit 13 protruding from a gap of an exterior casing 37 of the electronic equipment.

Figure 9:
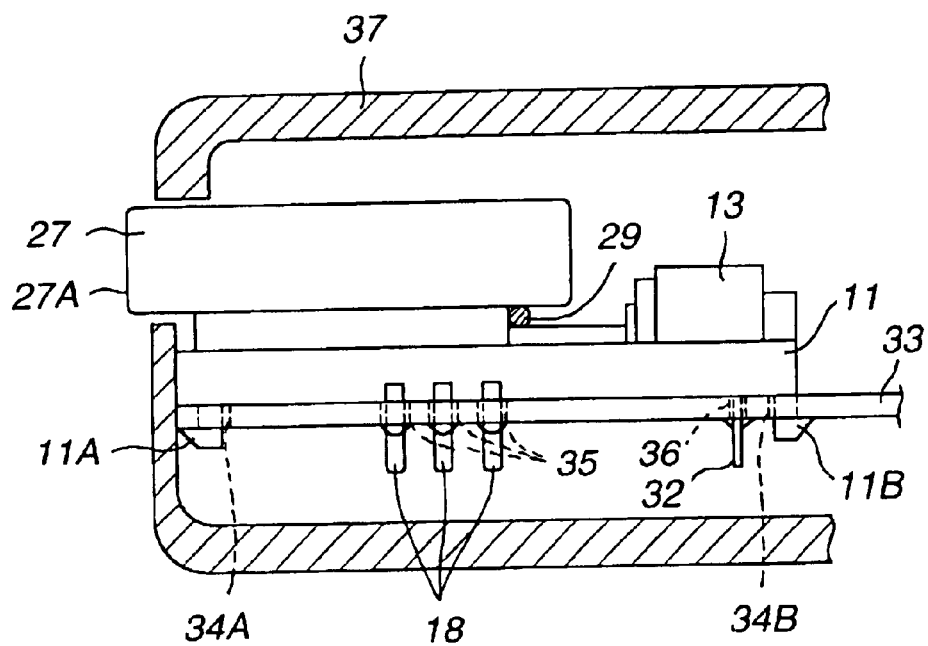
FIG. 9 is a side view of an equipment employing the jog dial for illustrating the loading state on the equipment.
Figure 10:
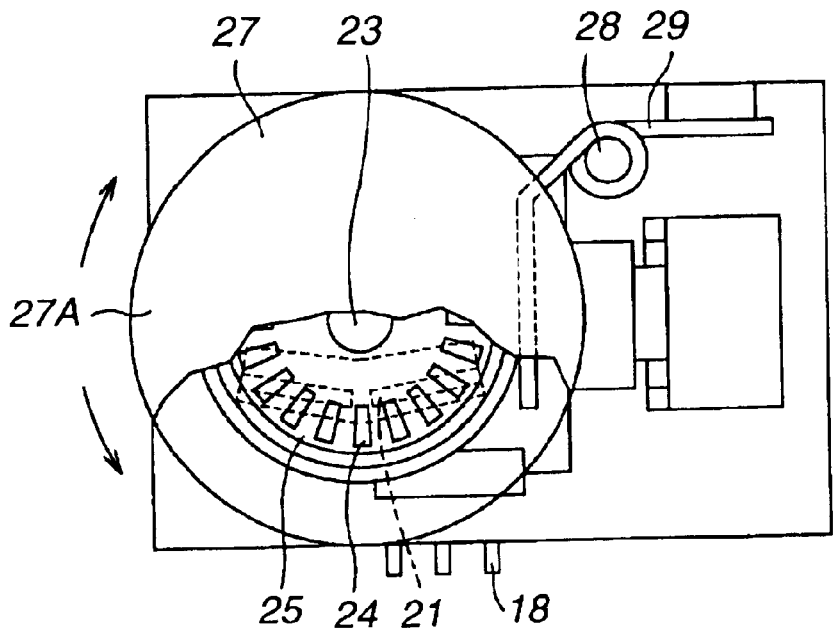
FIG. 10 is a top plan view for illustrating a rotary encoder portion of the jog dial, partially broken away.

The operation of the jog dial is explained. Referring first to FIGS. 9 and 10, a protruding portion 27A from the exterior casing 37 of the peripheral actuating knob 27 mounted on the upper end of the rotary encoding unit 12 is acted upon by a tangential force so as to perform a rotational movement, whereby the rotary member 25 is rotated about the center columnar shaft 23 of the box-shaped casing 20 as the center of rotation. The upper elastic contact leg 21 then slides in elastic contact with the radial contact plate 24 provided on its lower surface. This sliding contact portion generates pulse signals timed to the rotational actuation of the peripheral actuating knob 27.

The generated pulse signals are transmitted from the upper elastic contact leg 21 to the lower elastic contact leg 22 and thence to the contact plate 19 on the contact mounting substrate 11 to which is elastically contacted the elastic contact leg 22. The pulse signals are then transmitted to the circuit of the printed circuit board 33 of the electronic equipment through the terminal 18 for external connection.

Figure 11:
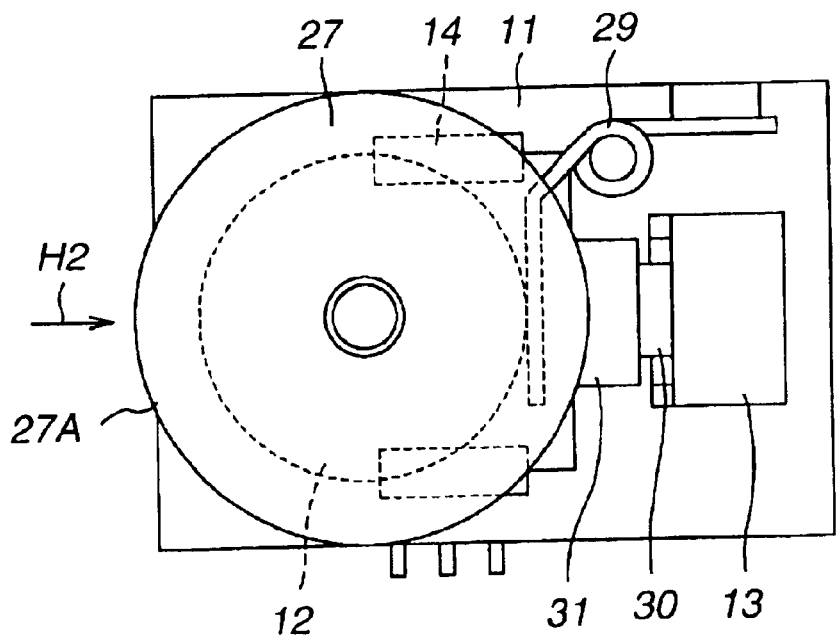
FIG. 11 is a top plan view for illustrating a push switch portion of the jog dial.

The protruding portion 27A of the peripheral actuating knob 27 then is acted upon with a thrusting force in the horizontal direction interconnecting the center of the knob and the push switch unit 13, as indicated by arrow H2, against the biasing force of the torsion coil spring 29 provided on the contact mounting substrate 11, as shown in FIG. 11, to cause movement of the entire rotary encoding unit 12 in the horizontal direction along the guide rail unit 14 of the contact mounting substrate 11 to push the actuating button 30 with the projection 31 provided on the box-shaped casing 20. The resulting signal is transmitted to the circuitry of the printed circuit board 33 of the electronic equipment through a connection terminal 21 shown in FIG. 9.

If the thrusting force applied to the peripheral actuating knob 27 is removed, the rotary encoding unit 12 is pushed back under the elastic recoiling force of the torsion coil spring 29 of the contact mounting substrate 11 to resume the state shown in FIG. 10.

In the above-described structure, the elastic contact leg 22, protruded downwards from the bottom surface of the box-shaped casing 20 of the rotary encoding unit 12, elastically contacts the contact plate 19 of the contact mounting substrate 11, as means for transmitting the electrical signals of the rotary encoding unit 12 to the contact plate 18 of the contact mounting substrate 11. Alternatively, the elastic contact leg may be protruded from the contact mounting substrate 11 so as to be elastically contacted with the contact plate on the bottom surface of the box-shaped casing 20. The foregoing is the explanation of the structure and the operation of the jog dial-4 provided on the right lateral surface of the main body portion 2.

Of course, the jog dial 4 may be provided on the left lateral surface of the main body portion. The jog dial 4 may also be arranged centrally of the front surface of the main body portion 2 so that the jog dial 4 can be actuated with a thumb finger as the touch pad 6 is actuated with the index finger. The jog dial may also be arranged on the left or right surface of the display portion 3 carrying the LCD 7, or along the left or right edge of the touch pad 6. The jog dial may also be arranged longitudinally between left and right buttons or longitudinally between G and H keys of the keyboard unit 5. The jog dial may also be arranged in an angled direction to permit facilitated actuation with respective fingers without distinction as to longitudinal or transverse directions. The jog dial 4 may also be arranged at a position permitting actuation with a thumb finger on a lateral surface of the mouse as the pointing device. An exemplary electrical structure of the notebook personal computer 1 is explained with reference to FIG. 1, a central processing unit (CPU) 11 comprises e.g., Pentium (trademark) of INTEL INC., and is connected to a host bus 52. To the host bus 52 is connected a north bridge 53 which in turn is connected to a PCI bus 56. The north bridge 53 comprises e.g., 400BX manufactured by INTEL. INC., and is adapted for controlling the CPU 51 or the main memory 54 with its periphery. The north bridge 53 and the south bridge 58, as later explained, constitute a so-called chip set.

The north bridge 53 also is connected to a main memory 54 and to a cache memory 55 adapted for caching data used by the CPU 51. Although not shown, a first-order cache memory is enclosed in the CPU 51.

The main memory 54 comprises e.g., a DRAM (dynamic read-only memory) adapted for storing the programs executed by the CPU 51 or data necessary for the operation by the CPU 51. Specifically, at the time point of end of startup, an E-mail program 54A, an auto-pilot program 54B, a jog dial state monitor program 54C, a jog dial driver 54D, an operating program (OS) 54E and other application programs 54F1 to 54Fn are transferred from an HDD 70 for storage in the main memory 54.

The E-mail program 54A is a program for exchanging communication text over the network with communication networks, such as telephone network 76, over a modem 75, which will be explained subsequently. The E-mail program 54A also has the function of acquiring oncoming mails as a specified function. This oncoming mail acquiring function inquires whether or not a mail addressed to the user has arrived at the mail box 79 to a mail server 78 of a provider 77 and acquired a mail addressed to the user, if any.

The auto-pilot program 54B sequentially starts pre-set plural processing operations or programs to perform the processing.

The OS (basic program software) 54E, typified by the Windows 95 or Windows 98 (trademarks) by MICROSOFT INC. or MAC OS (trademark) by APPLE COMPUTER INC., controls the basic operations of the computers.

The jog dial state monitor program 54C receives the notice from the respective application as to whether or not the applications are adapted for coping with the jog dial. If the notice is affirmative, the jog dial state monitor program 54C operates to demonstrate what can be done by actuating the jog dial 4. The jog dial state monitor program 54C is usually in a state of awaiting an event of the jog dial 4 and owns a list for receiving notices from the application. The jog dial state monitor program 54C is responsive to the actuation of the jog dial state monitor program 54C to execute various functions.

A video controller 57 is connected to a PCI bus 56 and is adapted for controlling the display on the LCD 7 on the display portion 3.

To the PCI bus 56 is connected a sound controller 64 adapted for capturing an input from a microphone 66 or supplying audio signals to a speaker 65. To the PCI bus 56 is also connected a modem 75 which can be connected over a public telephone network 76 or an Internet service provider 77 to a communication network 80, such as Internet, or to a mail server 78.

To the PCI bus 56 is also connected the south bridge 58 comprising e.g., PIIX4E of INTEL INC. and which is adapted for controlling various I/O (input/output). That is, the south bridge 58 comprises an IDE (Integrated Drive Electronics) controller/configuration register 59, timer circuit 60 and an IDE interface 61, and is adapted for controlling a device connected to the IDE bus 62 or a device connected via an IS A/EIO (Industry Standard Architecture/Extended Input Output) bus 63 or an embedded controller 68.

The IDE controller/configuration register 59 is made up of two IDE controllers, namely a so-called primary IDE controller and a secondary IDE controller, and a configuration register. These IDE controllers are not shown for simplicity of the drawings.

The primary IDE controller is connected over the IDE bus 62 to a connector, not shown. An HDD 67 is connected to the connector. When bay devices, as so-called IDE devices, such as CD-ROM drive, second HDD or FDD, not shown, are loaded over other IDE buses, the secondary IDE controller is electrically connected to connectors of the loaded bay devices.

Meanwhile, the HDD 67 has stored therein plural application programs 67F1 to 67Fn, in addition to the autopilot program 67B, auto-pilot program 54B, jog dial state monitor program 54C, jog dial driver 54D and the OS (basic program software) 67E. The above-mentioned respective programs 67A, 67B, 67C, 67D, 67E and 67F1 to Fn in the HDD 67 are sequentially transferred to the RAM 54 for storage therein during the startup (bootstrap) process.

To the ISA/EIO bus 63 is also connected an embedded controller 68 which comprises a micro-controller and which is used as an I/O controller. That is, the embedded controller 68 is constructed by an interconnection of an I/O interface 69, a ROM 70, a RAM 71 and a CPU 72.

In the ROM 70, there are stored from the outset a LED control program 70A, a touchpad input monitor program 70B, a key input monitor program 70C, a wakeup program 70D and a jog dial state monitor program 70E.

The LED control program 70A is a program for controlling the lighting of a lamp, such as a power source lamp PL, a battery lamp BL, a message lamp ML, if necessary, or other LEDs. The touchpad input monitor program 70B is a program for monitoring the user input from the touch pad 6. The key input monitor program 70C is a program for monitoring the input from the keyboard 5 or other key switches. The wakeup program 70D is a program for checking, based on current time data supplied from a timer circuit 60 within the south bridge 58, whether or not the time is the preset time and, should the time be the pre-set time, various chip power sources are managed for starting pre-set processing operations or programs.

The jog dial state monitor program 70E is a program for perpetually monitoring whether the rotary encoding unit 12 of the jog dial 4 has been rotated or pressed. The jog dial state monitor program 70E will be explained in detail subsequently.

In the ROM 70 is further written BIOS (basic input/output system) 70F. The BIOS is a basic input/output system, that is a software program controlling data exchange (input/output) between the OS or the application software and peripherals, such as display, keyboard or HDD.

The RAM 71 includes registers for a touchpad input status, a key input status and for time setting, and a jog dial status monitor I/O register, as registers 71A to 71F. For example, an LED control register 71A controls the lighting of a message lamp ML displaying the instantaneous rising state or the E-mail on thrusting the jog dial 4 as explained later. The key input status register 71C stores an actuating key flag when the jog dial 4 is pushed for one-touch operation as later explained. The time setting register 71D is able to set optional time.

To the embedded controller 68 are connected the jog dial 4, touch pad 6 and the keyboard 5 through a connector, not shown, to output signals associated with the operations of the jog dial 4, touch pad 6 and the keyboard 4 to the ISA/EIO bus 63. To the embedded controller 68 are also connected the power source lamp PL, battery lamp BL, message lamp ML and other LED lamps.

To the embedded controller 68 is also connected a power source control circuit 73 in turn connected to an enclosed battery 74 or an AC power source. The power source control circuit 73 furnishes the necessary power to each block, while managing control to charge secondary batteries of the peripherals. The embedded controller 68 also monitors a power source switch 8 operated on turning the power source on or off.

The embedded controller 68 is able to execute the above-mentioned programs 70A to 70E by an internal power source at all times even when the power source 8 is turned off. That is, the above-mentioned programs are running at all times even if no windows are opened on the LCD 7 of the display portion 3. That is, the embedded controller 68 executes the jog dial state monitor program 70E at all times even when the power source switch 8 is off or the OS54 is not started on the CPU 51. In particular, the embedded controller 68 furnishes the function of a programmable power key (PPK) to the notebook personal computer 1 even if the computer is not provided with a dedicated key, such that the desired software or the script file can be started simply when the user pushes the jog dial 4 in the power saving mode or in a power down state.

Figure 13:
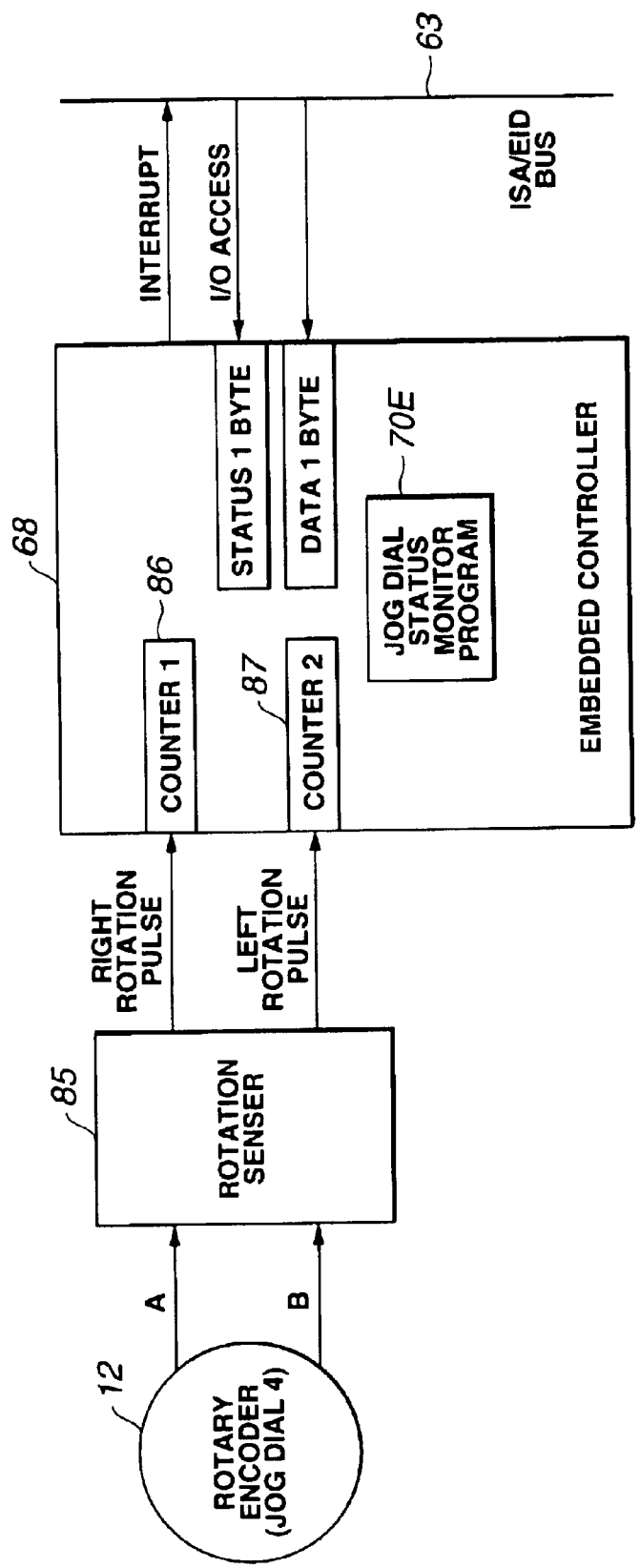
FIG. 13 shows a hardware structure in which the status of the rotary encoder portion of the jog dial is being monitored through a rotation sensor by an embedded controller.
Figure 14:
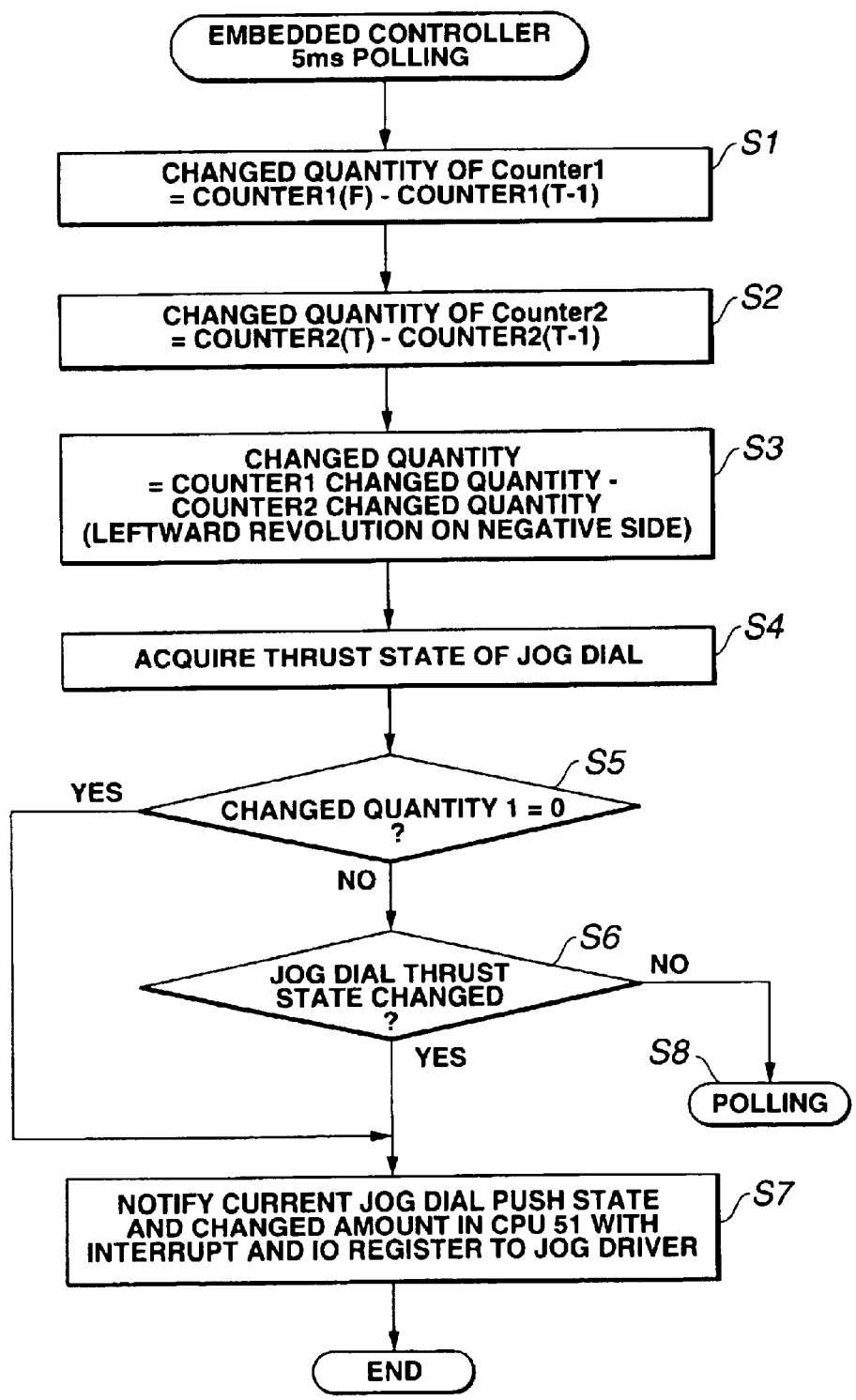
FIG. 14 is a flowchart showing the progress of the jog state monitor program by the embedded controller.
Figure 15:
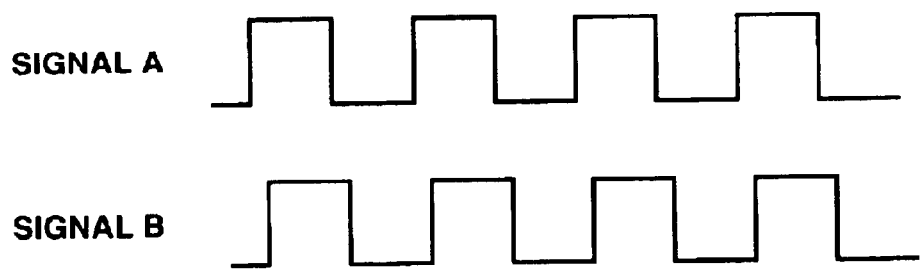
FIG. 15 is a timing chart for illustrating the operation of the rotation sensor in FIG. 13.
Figure 15:
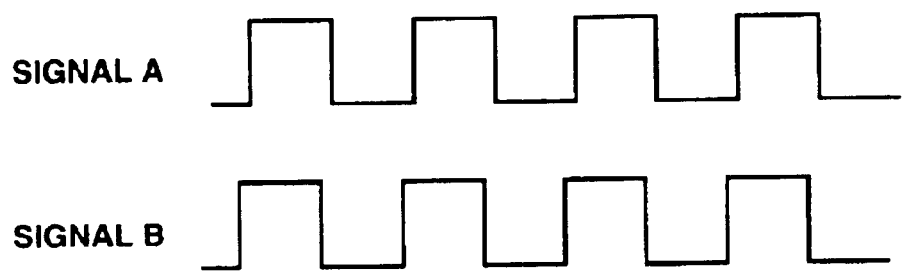

Referring to FIGS. 13 to 15, the operation of the e48 on execution of the jog dial state monitor program 70E is explained. FIG. 13 shows the hardware configuration for monitoring of the state of the rotary encoding unit 12 of the jog dial 4 by the embedded controller 68 through a rotation sensor 85. FIG. 14 shows a flowchart for illustrating the execution of the jog dial state monitor program 70E by the embedded controller 68. FIG. 15 shows a timing chart for illustrating the operation of the rotation sensor 85 shown in FIG. 13.

When the rotary encoding unit 12 of the jog dial 4 is rotated towards left or right, the rotation sensor 85 detects whether the rotation of the rotary encoding unit 12 is the leftward rotation or the rightward rotation, based on the timing of the signals A and B shown in FIG. 15. If the rotation of the rotary encoding unit 12 is detected to be the rightward rotation, the rotation sensor 85 sends a rightward rotation pulse to a counter (1) 86 of the embedded controller 68. Conversely, should the rotation of the rotary encoding unit 12 be detected to be the leftward rotation, the rotation sensor 85 sends a leftward rotation pulse to a counter (2) 87 of the embedded controller 68.

The embedded controller 68 executes the jog dial state monitor program 70E to monitor the variation of the counter (1) 86 and the counter (2) 87, difference therebetween and whether or not the jog 4 has been pushed, by polling at intervals of 5 ms.

First, at step S1 in FIG. 14, the count value counter 1(T-1) at time T-1 is subtracted from the count value Counter 1 (T) at current time T of the rightward rotation pulse to find the variation Counter 1 of the count value of a counter 87.

Then, at step S2, the count value Counter 1(T-1) at time T-1 is subtracted from the count value Counter 1(T) at current time T of the leftward rotation pulse to find the variation Counter 2 of the count value of a counter 87.

At step S3, the difference between the variations of the count values, that is the difference between the variation Counter 1 and the variation Counter 2, is found. If this difference between the variations is negative, the rotation is leftward.

On the other hand, the pressed state of the jog dial 4 is acquired at step S4. At step S5, the variations as found at step S3 are checked. At step S6, it is checked whether or not the pressed state of the jog dial 4 has been changed. If it is verified that the variation is detected at step S5, or that the pressed state has been changed at step S6, the current pressed state of the jog dial 4 and the variation are notified by interrupt through an I/O register 71F to the jog dial driver 54D, started by the CPU 51.

If there is no change at step S6 in the pressed state of the jog dial 4, the program moves to step S8, where the polling is terminated and the processing as from step S1 is repeated after lapse of 5 ms.

Figure 16:
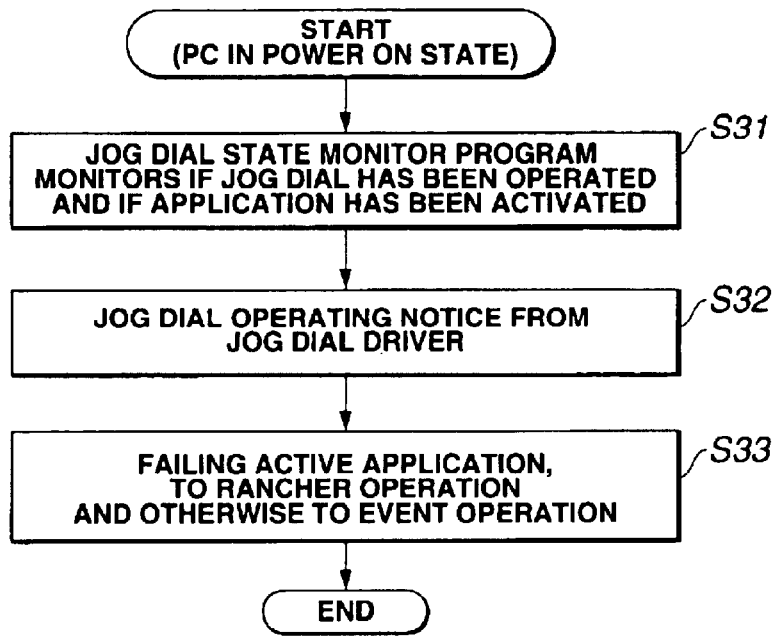
FIG. 16 is a flowchart for illustrating the jog dial state monitoring program executed by the CPU of the notebook type computer after turning on of a power source switch.

After the power source switch 8 is turned on, the CPU 51 executes the jog dial state monitor program 54C in accordance with the procedure shown in FIG. 16.

That is, at step S31, it is perpetually monitored whether or not the jog dial 4 has been acted upon. It is also monitored whether or not the E-mail program 54A or other applications 54F1 to 54Fn have been activated. Here, the state of the jog dial 4 is monitored to monitor the processing from the jog dial state monitor program 70E on the side of the CPU 51 through the jog dial driver 54D, with the operation being substantially the same as the operation explained with reference to FIG. 13.

If a notice on the operation of the jog dial 4 is sent at step S32 from the jog dial driver 54D, the program moves to step S33 where it is verified whether or not there is any active application. If there is no active application, the program proceeds to the launcher operation and, if otherwise, to an event operation. The launcher operation means the operation of selecting the registered application.

The launcher operation is explained briefly. This launcher operation is valid on the condition that there is currently no active application, as described above. In the jog dial menu are displayed applications previously registered in the launcher list. In the launcher list, there are registered application associated with the jog dial.

When the launcher operation is executed, the jog dial menu indicating the launcher state is demonstrated on the LCD 7. In the jog dial menu, there is displayed and started a list of applications associated with the jog dial.

Assume that, when the pre-set OS54E has been started by the CPU 51, there is no activated application, and the user has pressed the jog dial 4 once in the direction indicated by arrow b in FIG. 3. The pushed state of the jog dial 4 then is received by the jog dial driver 54D by the forwarding of the flag state through the I/O register by interrupt, as explained with reference to FIGS. 13 to 15. So, the jog dial driver 54D routes an actuation notice to the jog dial state monitor program 54C similarly executed by the CPU 51.

Figure 17:
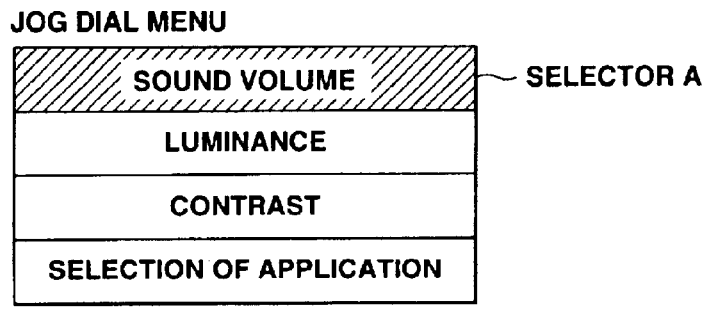
FIG. 17 illustrates an exemplary display of a jog dial menu.

The CPU 51 then starts the application program pre-registered in the launcher list in association with the jog dial for adjusting the volume of the speaker 65, luminance of the LCD 7 and its contrast and selecting the application, so that a jog dial menu shown in FIG. 17 is demonstrated on tile LCD 7 of the display portion 3 shown in FIG. 1. In this jog dial menu, there re displayed menu items "sound volume", "luminance", "contrast" and "selection of the application", associated with the processing operations of the sound volume adjustment, adjustment of luminance on the display portion, contrast adjustment and the selection of the application. In this example, the selector A is displayed as the initial state on the menu item "sound volume".

When the user then scrolls, that is rotates, the jog dial 4 in the direction indicated by arrow a in FIG. 3, for causing the movement of the selector A, the embedded controller 68 executes the calculations, explained with reference to FIG. 14, in accordance with the jog dial state monitor program 70E, and notifies the calculated variation to the jog dial driver 54D executed on the CPU 51.

Figure 19:
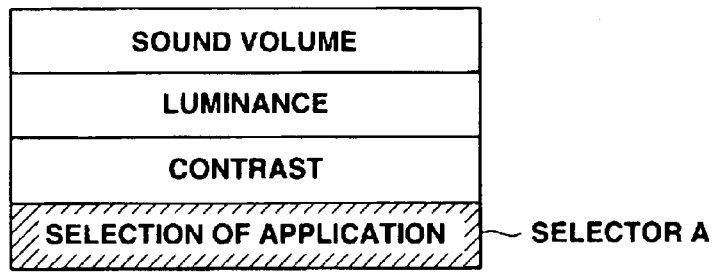
FIG. 19 illustrates yet another exemplary display of a jog dial menu.

The jog dial driver 54D then routes an actuation notice to the jog dial state monitor program 54C so that the CPU 51 causes the selector A to be shifted to a menu item desired to be executed by the user. If, when the jog dial menu of FIG. 16 is displayed on the LCD 7, that is when the selector A is demonstrated on the "sound volume", the user rotates, that is scrolls, the jog dial 4 downwards a pre-set distance or angle as indicated by arrow a in FIG. 3, the selector A shifts to the menu item "luminance". If the user rotates the jog dial 4 further downwards, the selector A shifts to the menu item "selection of the application", as shown in FIG. 19.

Figure 18:
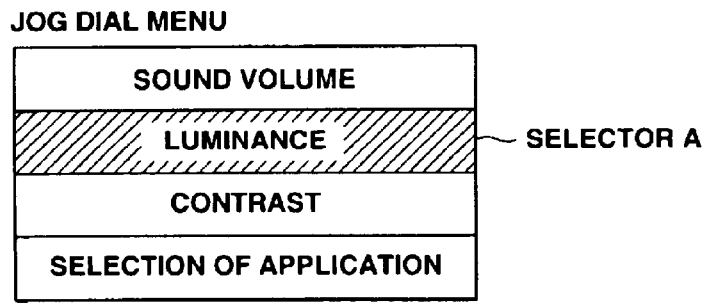
FIG. 18 illustrates another exemplary display of a jog dial menu.
Figure 20:
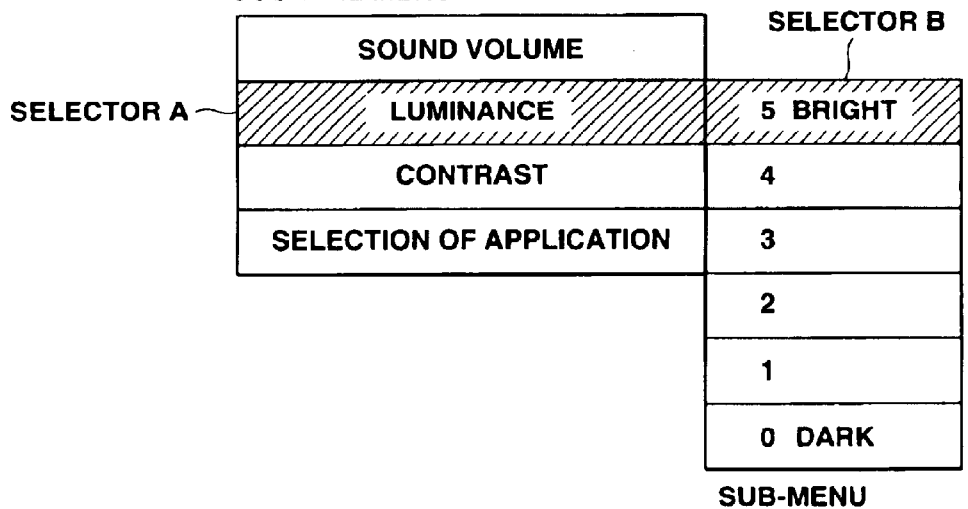
FIG. 20 illustrates an exemplary display of a sub-menu.

If, as a result of the rotating actuation by the user of the jog dial 4, the selector A has shifted to the menu item corresponding to the desired processing, the user pushes the jog dial 4 down in the direction indicated by arrow b in FIG. 3, by way of performing the selecting operation. So, if the selector A is displayed on the menu item "luminance", as shown for example in FIG. 18, the sub-menu associated with the menu item "luminance" is displayed, as shown in FIG. 20. In the present example, six sub-menus "5" to "0", corresponding to the sub-menu "5" selected when the luminance is to be maximum through to the sub-menu "0" selected when the luminance is to be minimum, are displayed. The amount of the variation of the jog dial 4 corresponding to the rotating processing of the jog dial 4 by the user is found by the processing by the embedded controller 68 shown in FIG. 14 and is sent to the jog dial driver 54D, while being monitored by the jog dial state monitor program 54C, to cause movement of the selector B.

Figure 21:
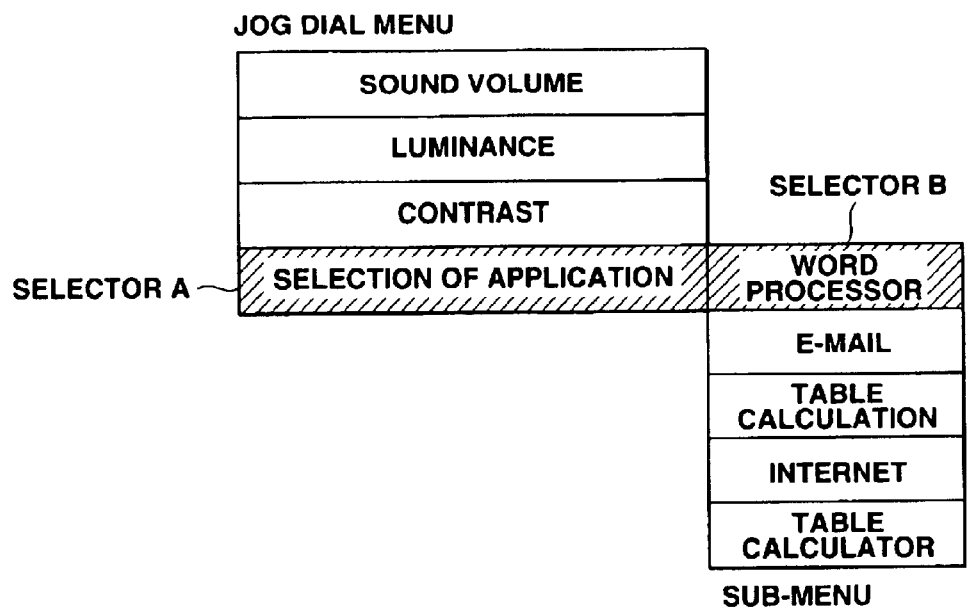
FIG. 21 illustrates another exemplary display of a sub-menu.

On the other hand, if the selector A is displayed on the menu item "selection of the application", as shown in FIG. 9, the sub-menu corresponding to the menu item "selection of the application", is displayed by the selecting operation by the user, as shown in FIG. 21. In the present example, the sub-menu item "word processor", selected on startup of a word processor application, sub-menu item "E-mail" selected on startup of an E-mail program, sub-menu item "table calculations" selected on startup of a table calculation program, sub-menu item "Internet" selected on startup of an Internet program and the sub-menu item table "calculator"selected on startup of a table calculator program, are demonstrated. In the present example, the selector B on the sub-menu is demonstrated on the topmost submenu item.

The user then rotates the jog dial 4 to cause the selector B to be moved to the submenu item desired to be selected, and then presses the jog dial 4 to perform the selecting operation. This selects the submenu item displayed on the selector B to permit the corresponding processing to be executed. If, for example, the submenu item "3" in the example of FIG. 20 is selected, the luminance corresponding to the submenu item "3" is set. On the other hand, if the sub-menu item "Internet" is selected in the example of FIG. 20, the Internet program is started.

Figure 22:
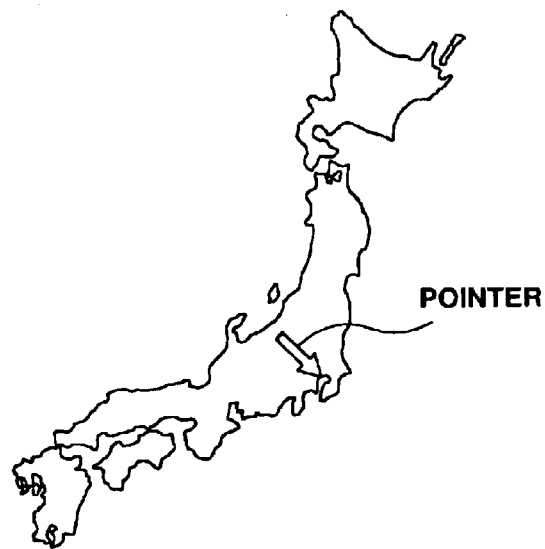
FIG. 22 illustrates an exemplary display of a map by an application program.
Figure 23:
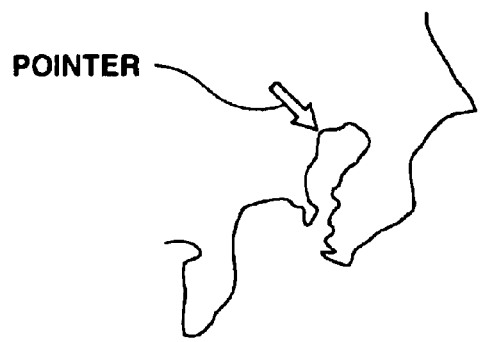
FIG. 23 illustrates another exemplary display of a map by an application program.

The case in which, after turning on of the power source switch 8, the CPU 51 executes the jog dial state monitor program 54C, and there is an active application at step S33 in FIG. 16, is explained. This case corresponds to the event operation described above. The application needs to be associated with the jog dial and specifically is to be a pre-set application program having a picture displaying function. In the present instance, the map of Japan shown in FIG. 22 is displayed on the LCD 7 by the application program. If the user rotates the jog dial 4 in this case, the picture is enlarged at a point indicated by a printer as the center, as shown in FIG. 23.

If the jog dial 4 is rotated in the opposite direction to that when the picture is enlarged, the picture is contracted, that is restored to the original size. So, in the pre-set application program having the picture displaying function associated with the jog dial, the picture displayed on the LCD 7 can be contracted or enlarged in association with the rotating operation of the jog dial 4.

Figure 24:
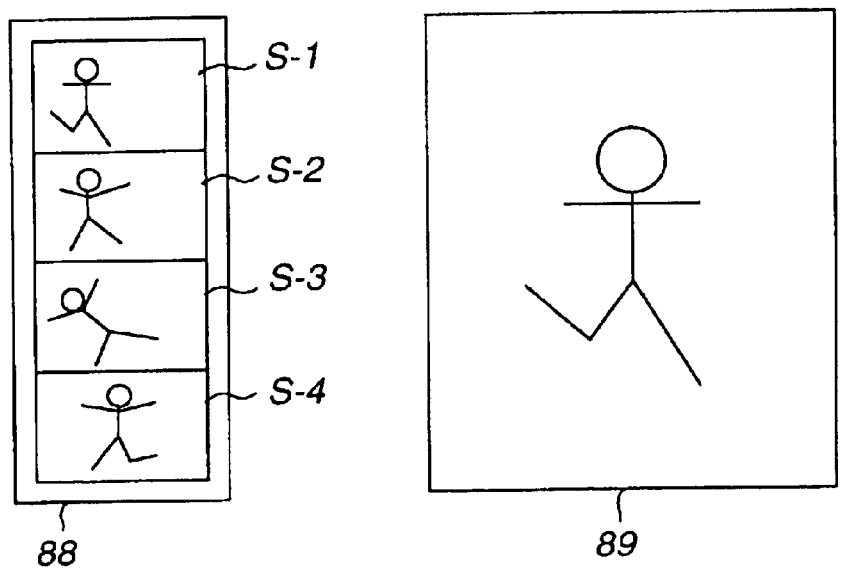
FIG. 24 illustrates an exemplary display of an editing screen by an application program.

The operation of the jog dial 4 in case the application having the moving picture editing function associated with the jog dial is started is explained. In the present example, it is assumed that an editing picture shown in FIG. 24 is demonstrated on the LCD 7.

This editing picture is made up of a displaying portion 88 (left side of the picture) and a displaying portion 89 (right side of the picture). In the displaying portion 88, four temporally consecutive four picture frames S-1 to S-4, among picture frames constituting a moving picture, are displayed. In the following description, if there is no necessity for discriminating the picture frames S-1 to S-4, these are simply termed picture frames S. On the right side displaying portion 89, there is displayed one of the picture frames S, among the picture frames demonstrated on the displaying portion 88, as selected by the selecting (pressing) operation on the jog dial. In the present instance, the pre-set editing processing for the picture frame S may be carried out by the picture frame S being demonstrated on the displaying portion 89.

With the editing picture being demonstrated on the LCD 7, the user rotates the jog dial 4 to advance or retract the picture frames S frame-wise to display the desired picture frame S on the displaying portion 88. When the desired picture frames S are demonstrated on the displaying portion 88, in this case, at the uppermost portion of the displaying portion 88, the user performs the selecting operation on the jog dial 4. This selects the picture frame S displayed in the uppermost portion of the displaying portion 88 to display the selected picture frame on the displaying portion 89. The user then performs an editing processing on the picture frame S demonstrated on the displaying portion 89.

Figure 25:
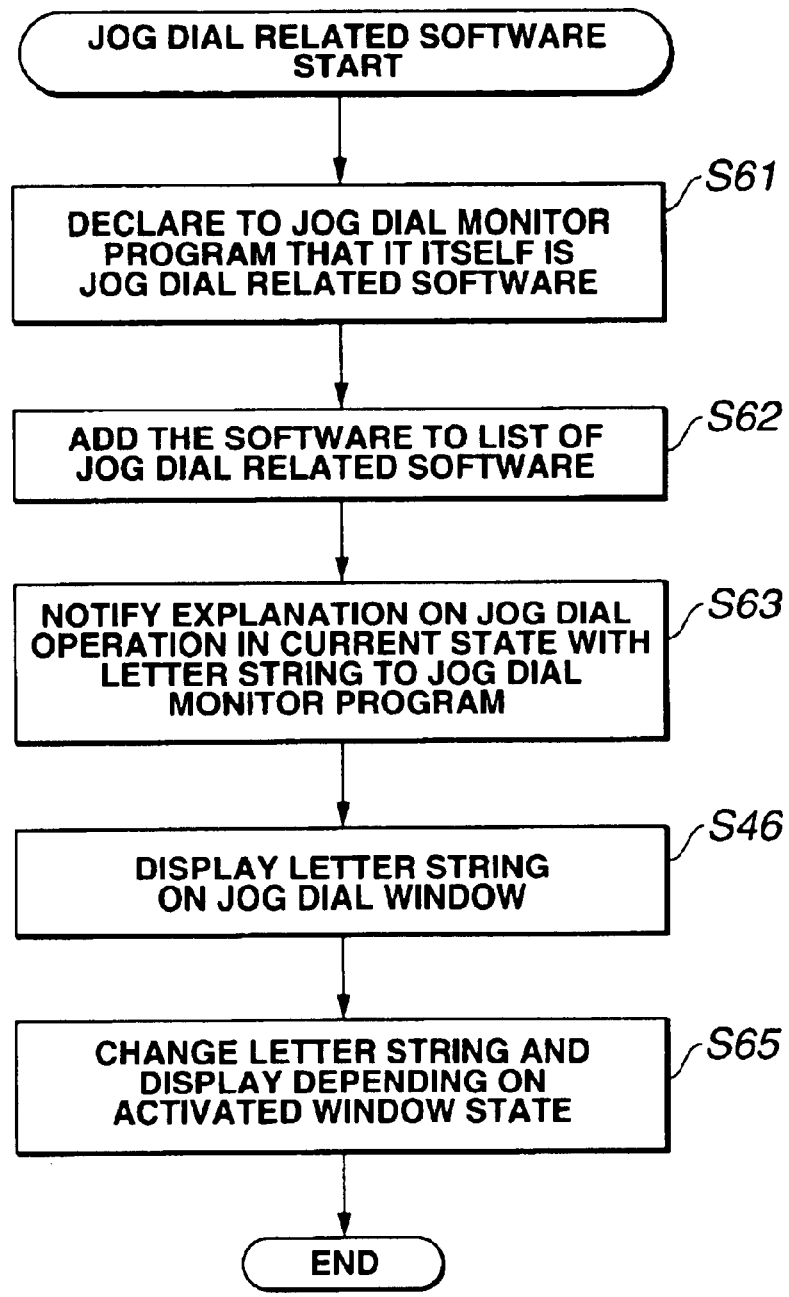
FIG. 25 is a flowchart for illustrating the notification processing executed by a jog dial accommodating application for a jog dial state monitor program executed by the CPU.

The above-mentioned applications as the specified examples are both the jog dial related software. However, not all applications stored in the HDD 67 and memorized in the RAM 54 after completion of the OS54E startup are not associated with the jog dial 4. For example, the application 54F3 is not associated with the jog dial. The processing on the jog dial which the CPU allocates to the jog dial related application and to the jog dial unrelated application. For this reason, the jog dial related application notifies to the jog dial state monitor program 54C executed on the CPU 51 in accordance with the procedure shown in FIG. 25.

First, at step S61, the jog dial related application declares to the jog dial state monitor program 54C that it is a jog dial related application. The jog dial state monitor program 54C then at step S62 adds the application software to the list of the jog dial related software.

Although not shown specifically, in the above explanation, the jog dial menu display may also be made known to the user in the form of a jog dial guide as a display proper to the application.

Figure 26:
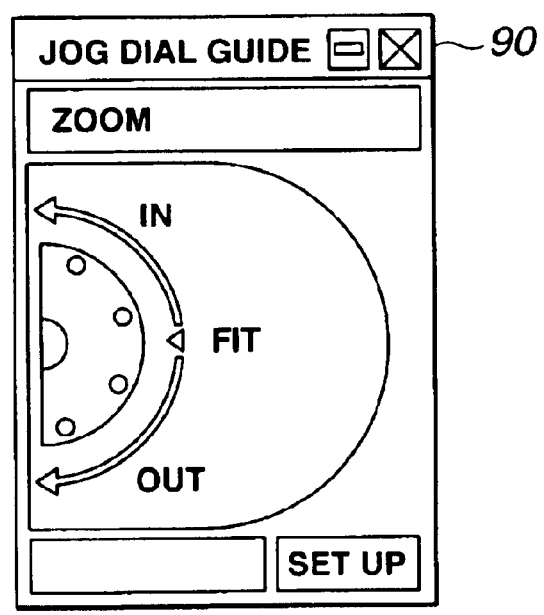
FIG. 26 shows a specified example of displaying the jog dial menu by a display proper to the application.

That is, at step S63, the jog dial related application notifies the illustration of the jog dial operation in the current state to the jog dial state monitor program 54C by a letter string. At step S64, a jog dial window 90 shown in FIG. 26 is displayed at step S64 to demonstrate letter strings, such as "jog dial guide", "zoom", "in", "fit" or "out".

The jog dial related application at step S65 changes the letter strings depending on the state of the activated window to rewrite the list of the jog dial state monitor program 54C.

So, if the jog dial related application is active, the display of the jog dial window 90 demonstrates, in letter strings, the illustration as to which operation is to be performed by the application subject to jog dial actuation.

A specified example of the jog dial related application is hereinafter explained.

Figure 27:
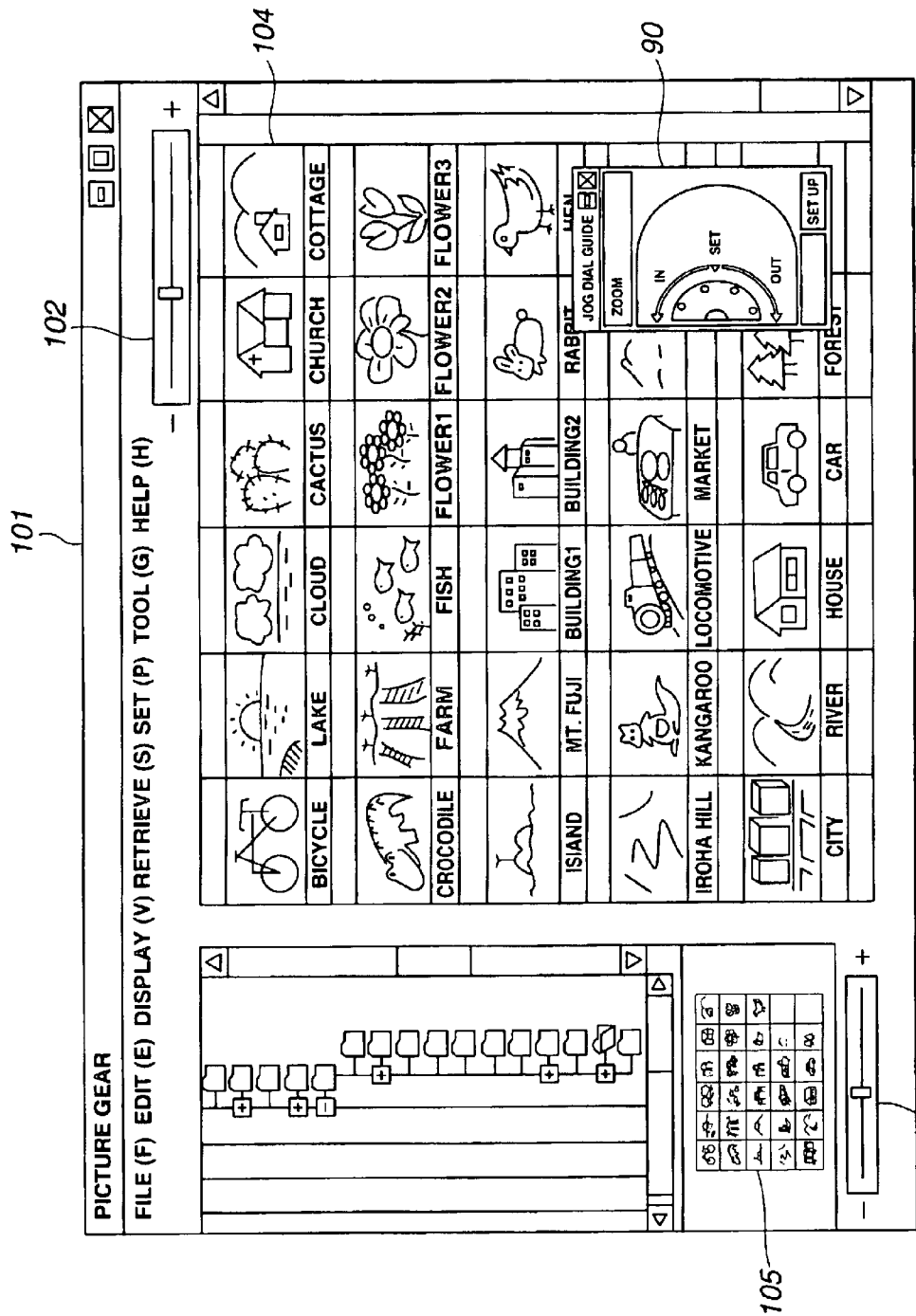
FIG. 27 illustrates an exemplary window display according to a first specified example of the jog dial accommodating application.

A first specified example is PictureGear (trademark) as a picture viewer and picture trimming tool. This PictureGear is explained by URL in http://vaio.sony.co.jp/software/PictureGear/indes. Html Internet home page. Briefly, this PictureGear is a software that is able to make concentrated management of still and moving pictures in a variety of removable mediums, such as hard disc, floppy disc, MO, PC cards or other card memory mediums. Each picture can be demonstrated as a list by a pre-set operation such that the user can have a view of the targeted picture at a glance. By picture trimming, 360° panorama or a label with photos can be prepared. It is also possible to deal with preparation of HTML albums permitting pictures to be viewed by a WWW browser. FIG. 27 shows a PictureGear window. In a picture display unit 104, a large number of pictures are displayed as a list in optional zooming states (sheet viewing display). For viewing a large number of pictures, it suffices to use another picture displaying unit 105 having a high contraction ratio. It is also possible to display a sole picture selected from the sheet view display on the picture display unit 104. The respective picture displaying units 104, 105 may be enlarged/contracted by gauge type slide actuators 102, 103 for zoom-in/zoom-out. In accordance with the present invention, this zoom-in/zoom-out is executed by rotation (scrolling) or thrusting (pushing). As for the procedure, the jog dial window 90 is displayed at a pre-set site, such as at a lower right corner, of the window 101 on startup of the PictureGear. Through the processing of the steps S63 and S64 of FIG. 25, what occurs on actuating the jog dial is demonstrated for the user. In sheet view display, it is indicated on the jog dial window 90 that the zoom-in/zoom-out operation can be performed by scrolling and that the operation of setting the pictures displayed in a list into order can be made by pushing in meeting with the window. In the case of a single picture display, it is indicated on the jog dial window 90 that the zoom-in/zoom-out operation can be performed by scrolling and that fitting to the window size is possible by pushing.

Figure 28:
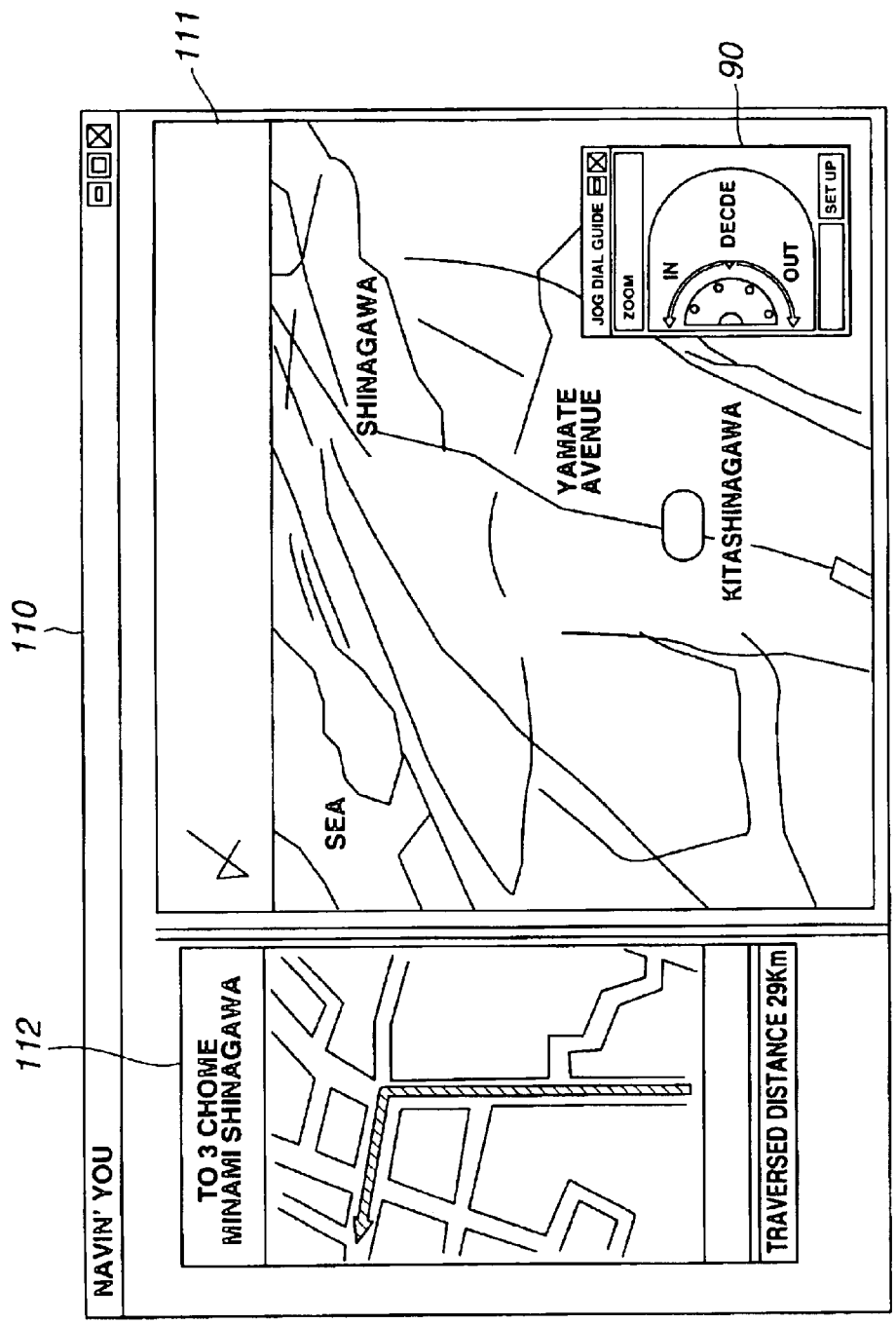
FIG. 28 illustrates an exemplary window display according to a second specified example of the jog dial accommodating application.

A second specified example is NavinYou (trademark) as a tool for displaying the map for the current position by GPS. This NavinYou is explained by URL in http://vaio.sony.co.jp/software/NavinYou/top. Html Internet home page. Briefly, this NavinYou is a software which enables a map to be manipulated with a realistic visual feeling with perspective in which a crossing or display approaches in keeping with the progress as the view is taken from the sky in addition to the conventional flat map display. The height of flight can be adjusted freely by a pre-set operation, and high-speed scrolling can be achieved simply by advancing the pointer in the desired direction. The operation can be achieved with a feeling as if the operator is manipulating an aircraft. FIG. 28 shows a NavinYou window 110 in which there are displayed a three-dimensional display 111 and a two-dimensional display 112. The jog dial window 90 also is displayed at the lower right corner in the window 110. Through the processing of the steps S63 and S64 of FIG. 25, what occurs on actuating the jog dial is demonstrated in the jog dial window 90 for the user on actuating the jog dial. It is demonstrated in this case that the zoom-in/zoom-out operation for a map can be realized by scrolling the jog dial 4, that the display of a setting picture which might affect the manipulation can be realized by pushing and that the setting picture may cease to be demonstrated by re-pushing through the processing of step S65.

Figure 29:
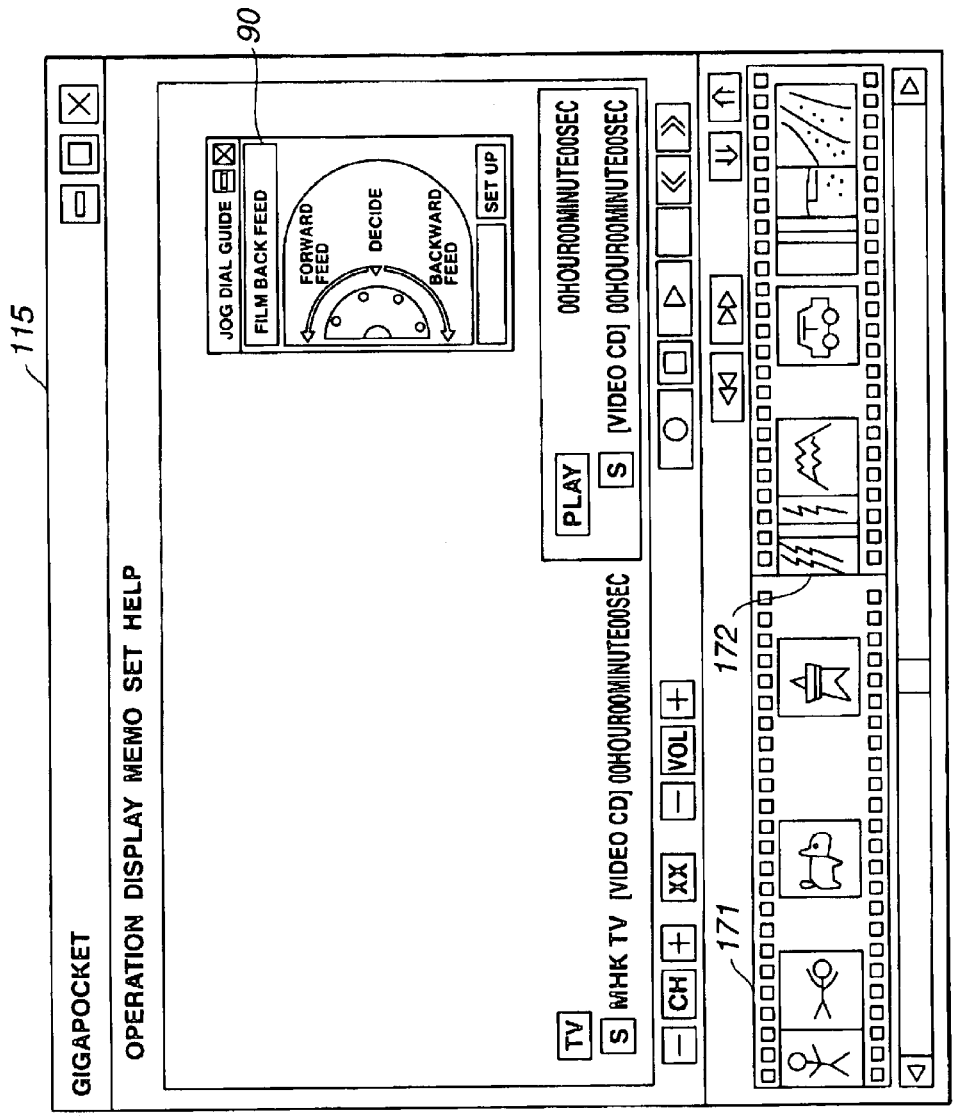
FIG. 29 illustrates an exemplary window display according to a third specified example of the jog dial accommodating application.

A third specified example is the GigaPocket (trademark) which is a sort of the software which allows for recording, playback and management of a television program a video picture to high picture quality and by easy manipulation. This GigaPocket is explained by URL in http://vaio.sony.co.jp/GigaPocket/recorder. Html Internet home page. Briefly, by the "Giga video recorder" of this GigaPocket, the television program received by a TV tuner loaded on a MPEG2 real time encoder board of a personal computer, such as "Vaio" (trademark), or a video picture inputted from an external input terminal can be recorded and/or reproduced with high picture quality consistent with the MPEG2 system. Since the picture is recorded on a hard disc of the personal computer and reproduced by random access, it is possible to reproduce a recorded scene or to reproduce recorded another file as the recording is continued. Moreover, the "Giga video recorder" automatically detects large picture transitions during recording to preserve thumbnail pictures. The "Giga video recorder" is equipped with a "film roll function" of scroll-displaying thumbnail pictures in synchronism with the reproduction in the horizontal direction during reproduction. If the film portion is fed in advance and an optional point is specified, reproduction can be started from the specified point. So, the desired scene can be efficiently seen with a quick jump. This GigaPocket is a specifying example of the technique concerning the AV content recording and/or reproducing processing as disclosed by the present Assignee in the Japanese Patent Application H-11-117267. FIG. 29 shows a GigaPocket window 115 as a specified example in which the GigaPocket is started ad the AV contents are reproduced to display a still picture stored in plural still picture files. A still picture display window 171 demonstrates a still picture stored in the plural still picture files, that is a still picture at a scene transition, as a thumbnail picture of a pre-set size. The transverse position in the still picture display window 171 is associated with the time axis of a picture to be reproduced. The position indicated by a current position gauge 172 is in agreement with the current time point of the picture being reproduced. The left side of the drawing indicates a pre-set past time point after lapse of a pre-set time corresponding to the distance from the position of the current position gauge 172, that is a pre-set past time point at which the picture has already been reproduced. The right side of the drawing indicates a pre-set future time point a pre-set time ahead the current time point corresponding to the distance from the position of the current position gauge 172, that is a pre-set future time point at which the picture is to be reproduced. The thumbnail picture is arranged at a position registering with the scene transition time point and is displayed on the still picture display window 171. If scene transitions occur at short intervals of time, thumbnail pictures are displayed in overlaid state. As the display of the reproduced pictures proceeds, that is as time elapses, the displayed position of the thumbnail picture shifts from left to right on the drawing sheet.

By e.g., dragging the thumbnail picture, only the thumbnail picture displayed in the still picture display window 171 can be scrolled independently of the picture being reproduced. The distance between the thumbnail pictures always reflects the time between scene change time points and remains unchanged. Based on the thumbnail pictures, displayed on the still picture display window 171, the user is able to know the scene transition within a specified range quickly to view the desired scene immediately. Thus, the above-mentioned "film roll function" may be associated with the scrolling and pushing of the jog dial 4 to feed or retract the film portion in advance by scrolling to set the picture by pushing. Therefore, an optional point can be quickly set by feeding or retracting the film portion to start the reproduction as from the point thus set to enjoy the picture efficiently by quickly jumping to the desired scene.

Figure 30:
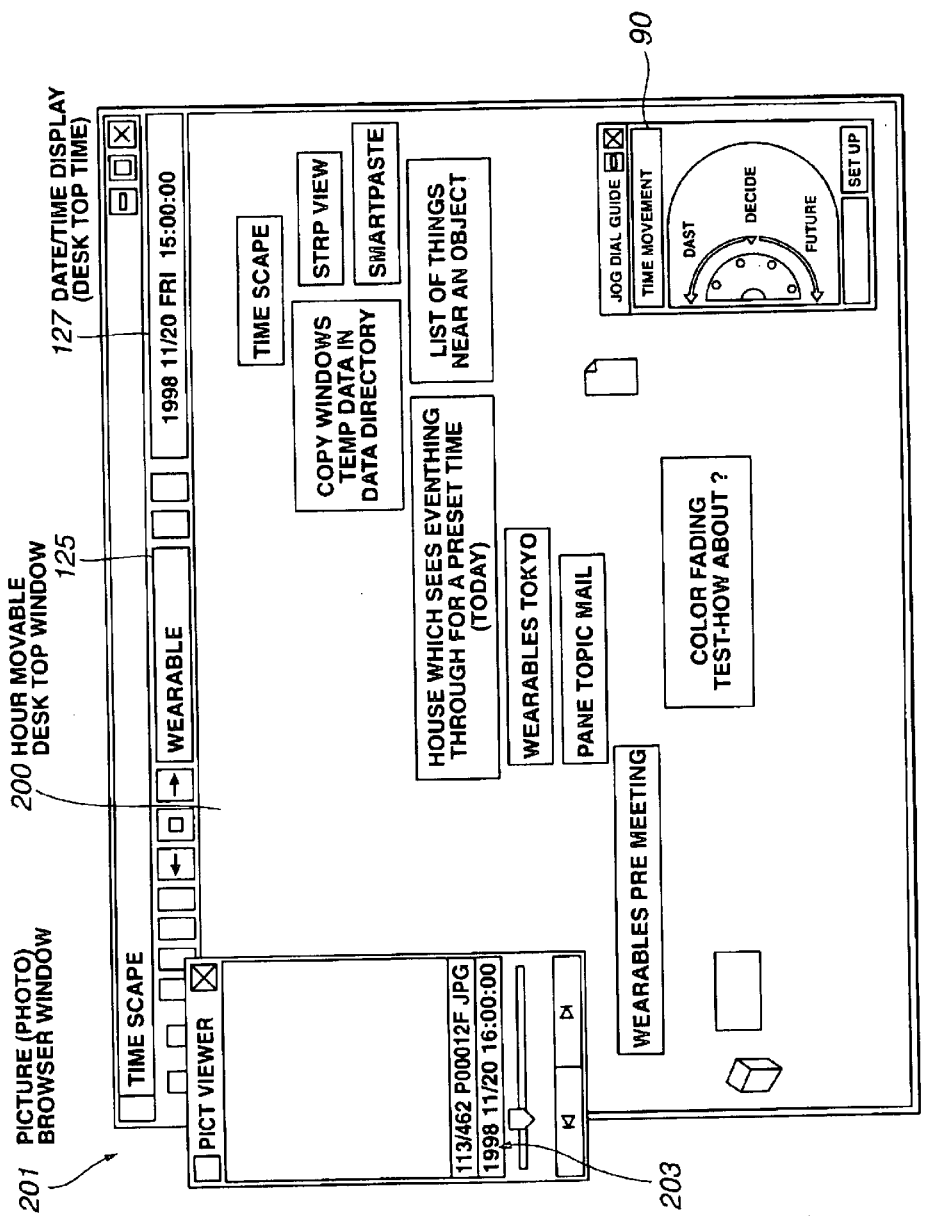
FIG. 30 illustrates an exemplary window display according to a fourth specified example of the jog dial accommodating application.

As a fourth specified example, the present invention may be applied to the technology concerning the application software in which a tag is displayed on a desk top to realize a time shiftable desk top environment, as disclosed in Japanese Patent Application H-11-108535 (corresponding to the internal priority application of the Japanese Patent Application H-10-321772) filed in the name of the present Assignee. FIG. 30 shows an exemplary display picture in case time concatenation is made between the application implementing the time-shiftable desk top environment and the application of a picture browser. It is assumed that, in FIG. 30, retrieval is made on the desk top by an application which implements the time-shiftable desk top environment to effect retrieval on the desk top and time shifting is made until a certain letter string or icon presents itself on the desk top. In the present case, it is assumed that a letter string "wearable" is inputted to a retrieving letter input space 125, this letter string "wearable" is retrieved by the application which achieves the time-shiftable desktop environment and that the icon or the letter string used at a time point of a conference pertinent to the letter string "wearable" is displayed on a time-shiftable desktop display window 200. In the present instance, the desktop environment of a conference held at 3 pm of Nov. 20, 1998 (Friday) is displayed on the window 200.

If the "application time" is determined by the application implementing the time-shiftable desktop environment, this time information is notified to the picture browser.

On reception of the time information, the picture browser displays the photographed picture in the vicinity of the time (during the conference) on a window 201. In the present instance, the photographed picture shot at 16 pm on Nov. 20, 1998 is displayed in the window 201.

If conversely the picture browser is acted upon, the state of the desk top at the photographing time point of the picture is regenerated. Therefore, should there be no particular caption (explanation) on the photographed picture, it can be understood in which situation the photograph has been shot.

By applying the present invention to this technology, the time shifting operation of the time-shiftable desktop display window 200 can be performed by the jog dial 4. The jog dial window 90 is displayed at the right lower corner of the time-shiftable desktop display window 200 to execute time shifting operation to the past or future by scrolling.

Other specified examples of the jog dial related applications (fifth to eleventh embodiments) are hereinafter explained only briefly. The fifth specified example is the SmartWrite (trademark) as a simple word processor. In this SmartWrite, the jog dial 4 is scrolled or rotated to effect scrolling up and down or is pushed to display jump to the head of a document in the jog dial window.

A sixth specified example is the SmartScript editor (trademark) as an automatic application execution tool. In this SmartScript editor, the jog dial is scrolled to execute the steps, while it is displayed on the jog dial window that the pushing at the time of recording for reproduction leads to pause.

A seventh specified example is the DV gate motion (trademark) as a digital video reproducing editing tool. In this DV gate motion, the jog dial 4 is scrolled to advance or retract a paused picture frame, while the jog dial 4 is pushed to effect marking to display it on the jog dial window.

An eighth example is the SmartCapture (trademark) as a still and moving picture retrieving tool in a digital video camera. In this SmartCapture, the function during scrolling on the finder screen, that on the still viewer and that on the movie player are made to be different from one another. It is because the letter string can be modified and displayed depending on the state of the window activated through the processing at step S65 shown in FIG. 25. On the finder screen, respective effecting levels can be set by scrolling, such as level setting during effecting for white noise addition. On the still viewer, still pictures displayed are selected on scrolling and a mailing software (mailer) is started by pushing. The mailer here is effective when a still picture is used as an attached file. On the movie player, the moving picture frames displayed are selected on scrolling and and mailing software (mailer) is again started by pushing.

A ninth specified example is the MediaBar (trademark) as a music-related playback tool. With this MediaBar, the previous and the following numbers are selected for playback on jog dial scrolling, with the reproduction being paused on pushing the jog dial.

A tenth specified example s the Jog Dial Browser as a tool for browsing the folder using a jog dial. The jog dial is scrolled to raise or lower the list, while the jog dial is pushed to display the file list below the folder if the folder has been selected or to execute the data program if the data program has been selected. If cancel is selected, the operation is terminated. If return is selected, a file list of a directly overlying folder is displayed.

An eleventh specified example is the hot key function allocated for level change and setting of luminance adjustment, sound volume adjustment, muting adjustment, LCD/VGA output setting and LCD/TV output setting. In the above-described specified examples, pre-set processing operations may be associated with the scrolling (rotation) and pushing (thrusting) of the jog dial and executed.

It has been stated only briefly in the foregoing that the jog dial state monitor program 70E is executed even if the power source switch 8 is off and the PS54E is not started on the CPU 51, the notebook personal computer 1 may be provided with a programmable power key (PPK) function even if the notebook personal computer 1 is not provided with a dedicated key and that a desired software or script file can be started by the user pushing the jog dial 4 during power saving mode or on power down. This will now be explained in detail.

This is the technology of automatically starting the functions provided on ab electronic equipment, such as a notebook personal computer, by a one-touch operation by a user, and is valuable in order to meet the demand of the user to see n E-mail instantly in the notebook personal computer or in order to meet the demand of the user to start the desired application instantly.

Up to now, a programmable power key (PPK) is provided on a lateral surface of a main body portion of the notebook personal computer and actuated by the user to start the desired application abruptly from e.g., the power saving or power down state.

Figure 31:
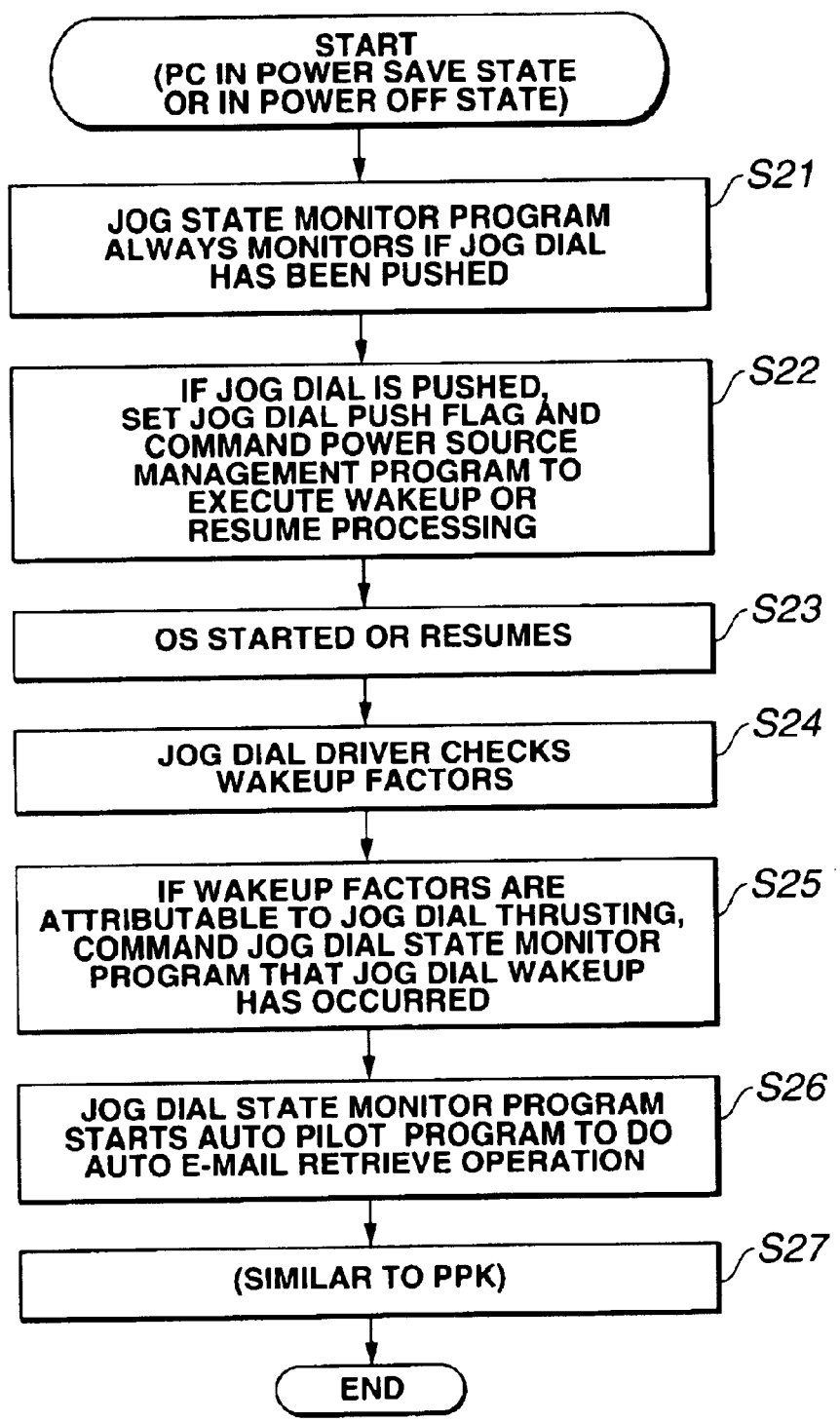
FIG. 31 is a flowchart showing the processing; procedure of instantly starting a desired application by pushing a jog dial even if the notebook personal computer is in the power saving mode or in the power down state.

According to the present invention, the desired application can be instantly started, subject to pushing the jog dial, by the processing sequence shown in FIG. 31, even if the personal computer is in the power saving or power down state.

Figure 12:
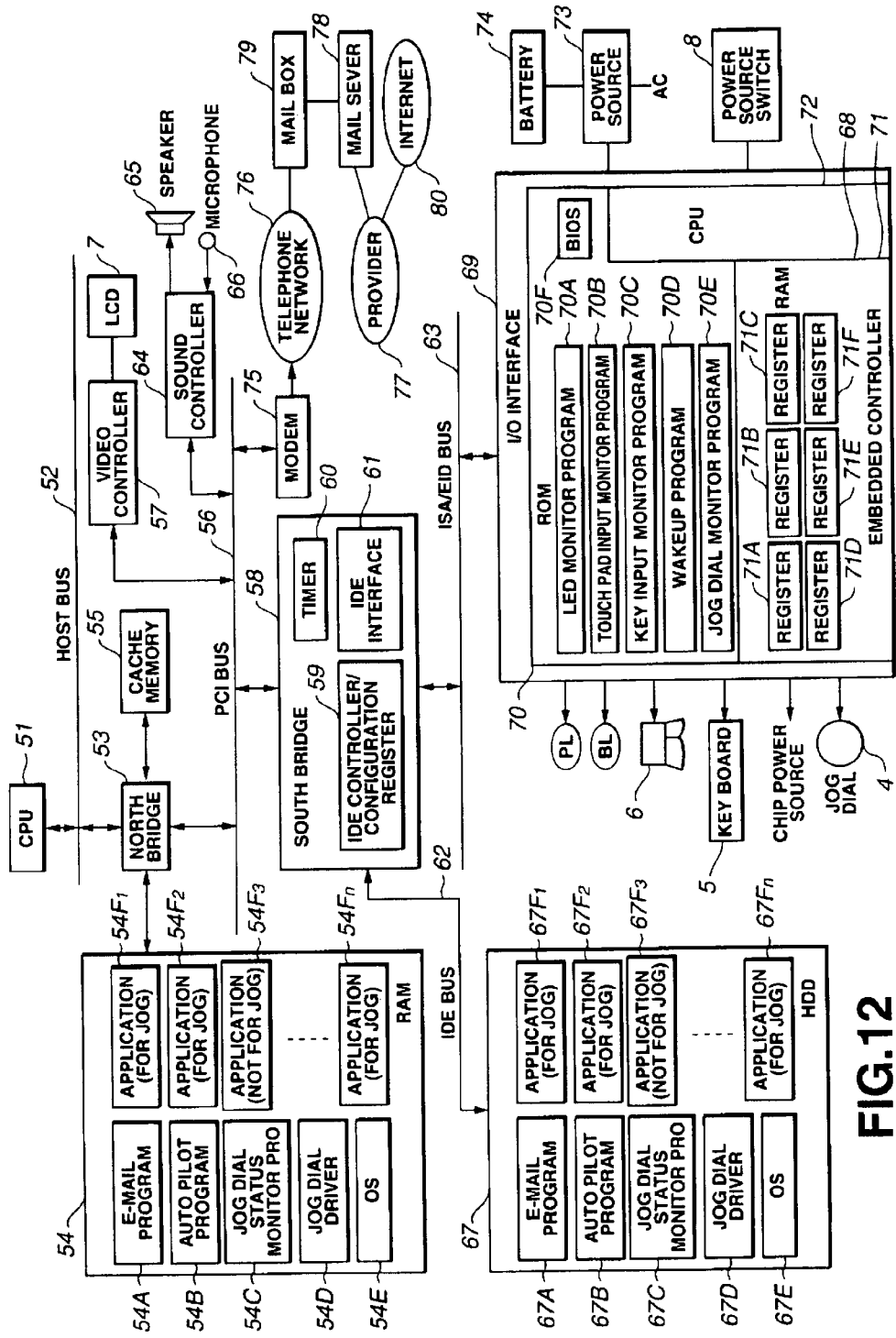
FIG. 12 is a electrical circuit diagram of the notebook type personal computer shown in the perspective view of FIG. 1.

First, at step S21, the jog dial state monitor program 70E of FIG. 12 perpetually monitors whether or not the jog dial 4 has been pushed. The processing is similar to that shown in FIGS. 13 to 15. If it is verified that the jog dial 4 has been pushed, at step S22, a jog dial pushing flag is set in a pre-set register of the RAM 71. The jog dial state monitor program 70E then commands the wakeup program 70D, as the power source management program, to execute the wakeup or resuming processing. The power source then is turned on to start or resume the OS54E at step S23.

The jog dial driver 54D then checks the wakeup factors at step S24. If the wakeup factor is found at step S25 to be the thrusting of the jog dial 4, the jog dial state monitor program 70E instructs the jog dial state monitor program 54C that the jog dial wakeup has occurred.

This causes the jog dial state monitor program 54C to start the auto-pilot program 54B at step S26 to automatic retrieve an E-mail by e.g., the E-mail program 54A.

Figure 32:
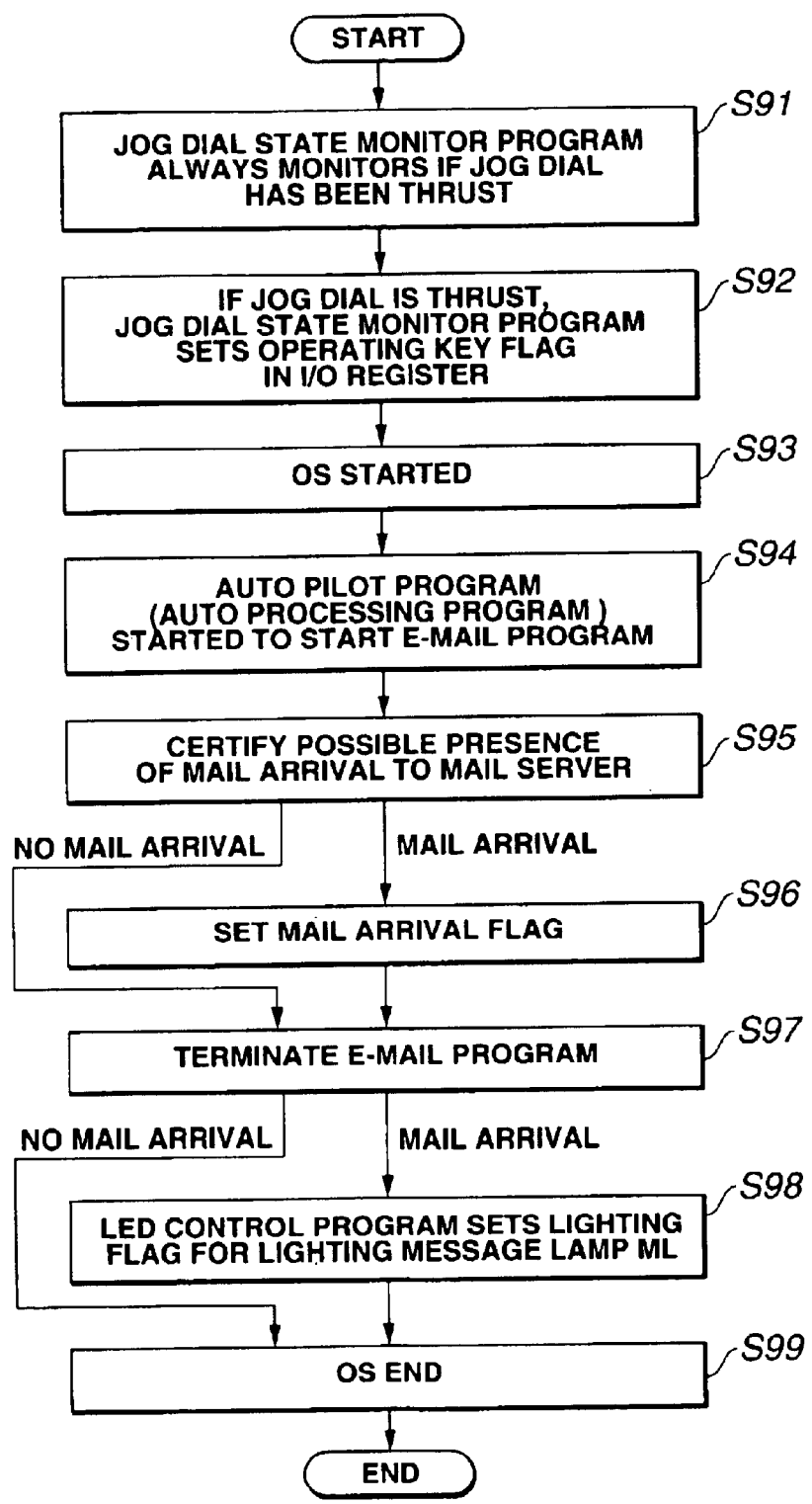
FIG. 32 is a flowchart showing the processing; procedure of instantly starting an E-mail application by pushing a jog dial even if the notebook personal computer is in the power saving mode or in the power down state.

At step S27, the processing downstream of step S94 of the processing shown in FIG. 32 is initiated. The steps S91 to step S94 of the flowchart of FIG. 32 summarize the processing from step S21 to step S26 of FIG. 31.

At step S95, the CPU 51 shown in FIG. 12 confirms the possible presence of an oncoming mail addressed to itself to the mail server 78. If there is such oncoming mail, a flag indicating the presence of the oncoming mail, the program moves to step S96 to set a flag indicating the presence of the oncoming mail to terminate the E-mail program. If there is the oncoming mail, the LED control program 70A writes a lighting flag for lighting the message lamp ML in the LED control register to light the message lamp ML at step S98. The OS54E is terminated at step S99. If there is no oncoming mail at step S95, the program moves to step S97 to terminate the E-mail program 54A. The program moves to step S99 to terminate the OS54E.

Figure 33:
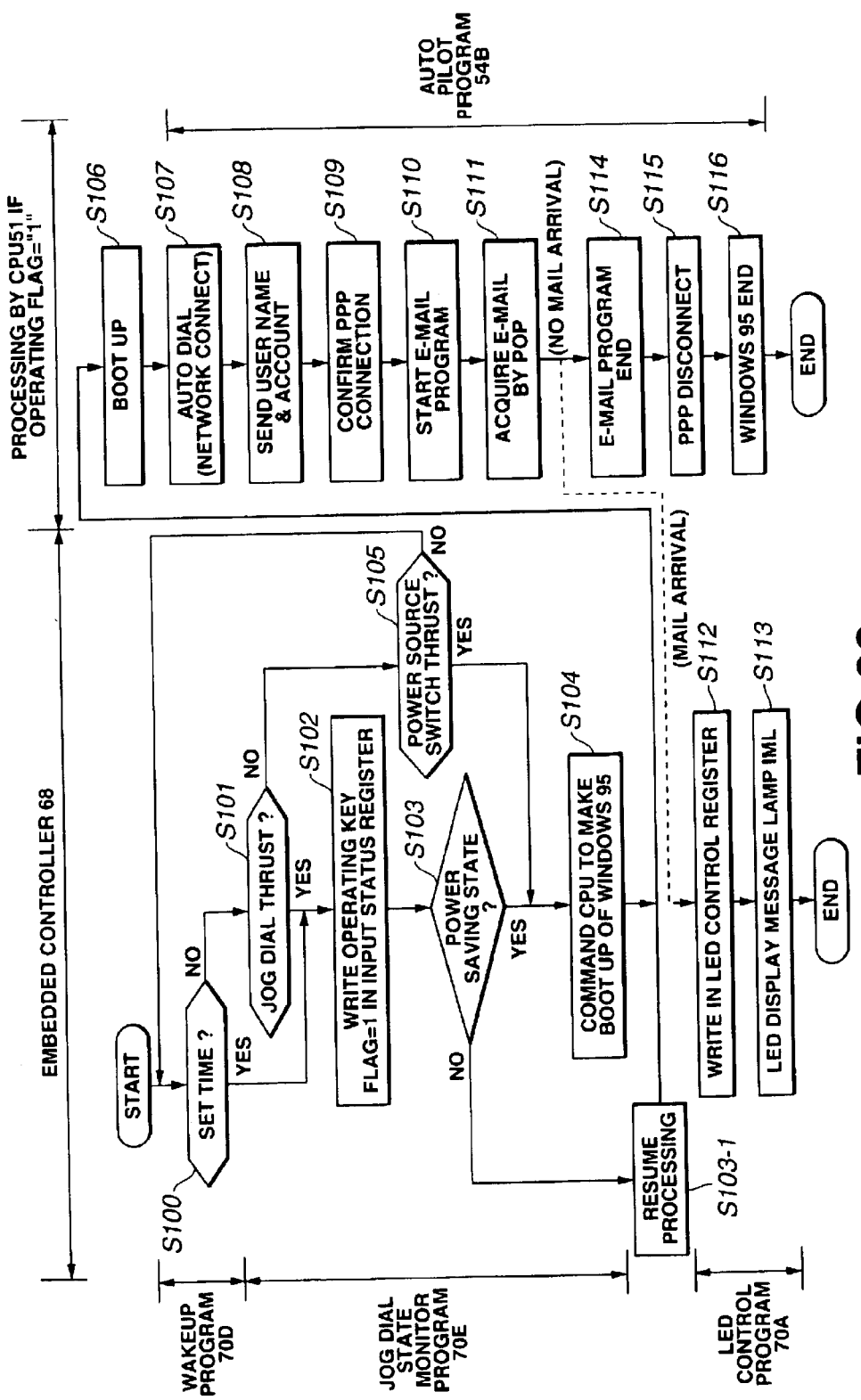
FIG. 33 is a flowchart for illustrating the processing of the flowchart of FIG. 32 in further detail.

Referring to FIG. 33, the processing by the embedded controller 68 and by the CPU 51 are further explained in detail.

In FIG. 33, the step S100 is executed by the wakeup program 70D, whilst the steps S101 to S105 are executed by the jog dial state monitor program 70E. On the other hand, the steps S112 and S113 are executed by the LED control program 70A, whilst the steps S107 to S116 are executed by the auto-pilot program 54B.

The steps S100 to S105 and the steps S112 and S113 belong to the processing executed by commands of the embedded controller 68, whilst the steps S106 to S116 belong to the processing executed by commands o the CPU 51.

First, at step S100, the embedded controller 68 checks whether or not the time is the setting time as set on the setting time register based on the wakeup program 70D. If the time is the setting time, the program moves to step S102. If the time is not the setting time and the user has pushed the jog dial 4 at step S101, the program moves to step S102. If the jog dial 4 has not been pushed at step S101, the program moves to step S105.

At step S102, the operating flag "1" is written in the jog dial status register. At the next step S103, the embedded controller 68 checks whether or not the operating mode is the power saving mode. If the CPU 51 etc is maintained in the power saving mode, the program moves to step S103-1 to execute the resuming processing. If otherwise, that is if the state is not the power saving state, a bootstrap command is issued to the CPU 51.

If the user has pushed the jog dial 4 at step S101 and the power source switch 8 is pushed at step S105, similar commands are issued at step S104.

If the processing advances from step S104 or S103-1 to step S106, the CPU 51 starts its processing. The jog dial operating flag is set to "1", as described above, the bootstrap or resuming operation of the OS54E and the bootstrap of the auto-pilot program 54B are carried out as appropriate. The bootstrap operation means startup operation.

At step S107, the CPU 51 commands auto-dialling processing to an accessing point of the Internet service provider 77 as previously set by the user to effect auto-dialling to the access point to the provider 77 through the telephone network 76.

At step S108, the account transmission of the user name (user ID) is performed at a timing as required by the provider 77. When the CPU 51 confirms the dial-up connection by the PPP at step S109, the E-mail program 54A shown in FIG. 12 is started at step S110 to execute the processing for acquiring the E-mail for the personal computer 1 on the client side from the mail server 78. If there is the oncoming mail to the user, the program moves to step S112 where the LED control program 70A writes a lighting flag to the LED control register of the RAM 71 to light the message lamp ML for display.

If there is no oncoming E-mail addressed to the user at step S111, the E-mail program 54A is terminated at step S114. The PPP connection with the provider 77 is interrupted at step S115. At the next step S116, the OS54E is terminated.

The embedded controller 68 provided with the jog dial state monitor program 70E perpetually monitors whether or not the jog dial 4 is pushed by the user. The user is able to perform the operation of acquiring the E-mail automatically simply by pushing the jog dial 4. That is, the user has only to push the jog dial 4 to automatically start the oncoming E-mail acquiring function.

The following specified function may be conceived as the function if instantly raising the one-touch operation by pushing the jog dial.

The first specified function is the BGM starting function. When the power source is turned on by the pressing of the jog dial to start the OS54E, the audio player application is started immediately and a MDI file for several to thousands of numbers previously stored in the HDD is started at random to automatically reproduce the BGM.

The second specified function is the handwriting memo start function. After the power source is turned on by the pressing of the jog dial to start the OS54E, the touch pad 6 as a pointing device is set to the absolute coordinate detection mode. The drawing application is then started to enable the inputting of the handwritten memo.

The third specified function is the scheduler function which, after the power source is turned on by the pressing of the jog dial to start the OS54E, starts the scheduler software to open the overview page for the current week.

The fourth specified function is the function of being operatively linked to digital still camera (DSC). The power source of the DSC is turned on to enable IrDA (infrared ray data) communication. The DSC is then set aside. After the power source is turned on by the pressing of the jog dial, and the OS54E is started, the communication software is started to establish the connection with the DSC to retrieve the picture data stored in the DSC into the HDD.

The fifth specified function is the function of starting two or more computers in unison. It is a target to realize data exchange with other computers. The two computers are interconnected by parallel cables and the jog dials of the two computers are pushed to turn on the power sources to start the OS54E. The two computers are connected by the cable connection function and, as the user checks the files in the specified folders by a time stamp, file synchronization is effected from a new file to an older file.

The sixth specified function is the IrDA function. It is a target to realize data exchange with other computers. The two computers are arranged so that the IrDA transmission/reception units face each other, and the two jog dials are pushed to turn on the power sources to start the OS54E. The two computers are connected by the cable connection function and, as the user checks the files in the specified folders by a time stamp, file synchronization is effected from a new file to an older file.

The seventh specified function is the panic combatting function, that is the function of displaying a picture different from the picture currently displayed. The different picture is a picture such as a "screen shot in case of computing prime cost in a table calculating software".

An eighth specified function is the security accommodating function, that is a function of pressing the jog dial to apply password lock to safeguard the terminal from illicit operation by an unauthorized person in the absence of the authorized user. The authorized user inputs a pre-registered password for unlocking.

A ninth function is the Internet accommodating function. After the jog dial is pressed to turn on the power source to start the OS54E, dial-up connection is made by PPP to start the WWW browser to display the specified URL page.

A tenth specified function is the in-store demonstration function. That is, the function of using the computer with articles demonstrated in a store. After the jog dial is pressed to turn on the power source to start the OS54E, the software for in-store demonstration is started to illustrate features of the article.

An eleventh specified function is the function of accommodating the ink word processor. After the jog dial is pressed to turn on the power source to start the OS54E, the ink word processor is started and the touch pad is switched to an absolute value mode to immediately set up a pen input enabling state.

A twelfth function is the function for enabling recognition of handwritten letters. After the jog dial is pressed to turn on the power source to start the OS54E, the letter recognition software is started to switch the touch pad to the absolute value mode to enable the inputting of handwritten letters.

A thirteenth function is the junction for accommodating fax memos. After the jog dial is pressed to turn on the power source to start the OS54E, the facsimile software is started to transmit the letters of illustrations etc inputted from keyboard or by handwriting by facsimile.

A fourteenth function is the function for accommodating the muting. After the jog dial is pressed to turn on the power source to turn off the sound function to start the OS54E. This function is used when sound emission inconveniences users, such as during conferencing.

By providing the jog dial with the one-touch actuating function, it is possible to command a sequence of operations including startup of a pre-set application or a pre-set operation, from the power source of the main body portion off or the power saving mode state, without the necessity of providing PKK etc.

It has been explained briefly with reference to FIG. 16 that the launcher operation and the event operation are established in the absence and in the presence of the currently active application, respectively. This will be explained in detail with reference to FIGS. 34, 36 and 37.

Figure 34:
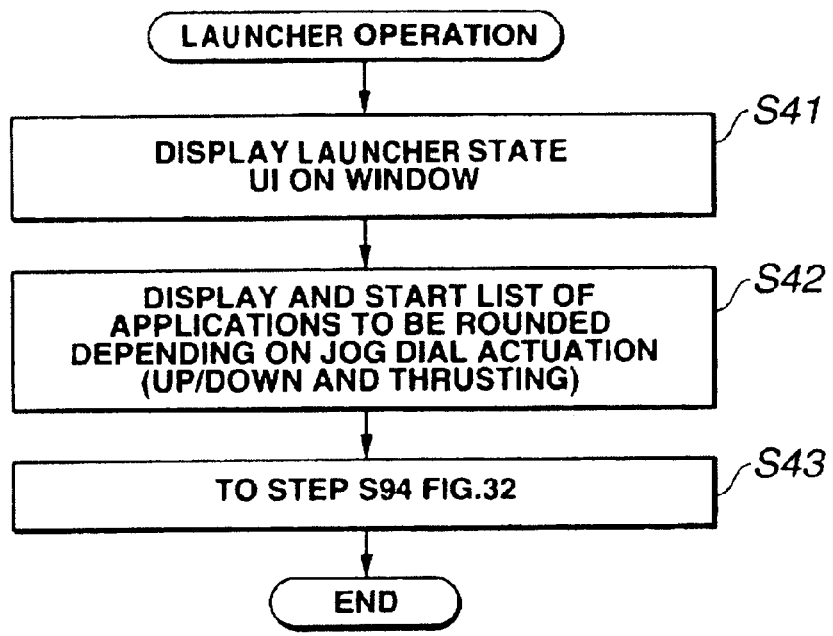
FIG. 34 is a flowchart for illustrating the launcher operation.
Figure 35A:
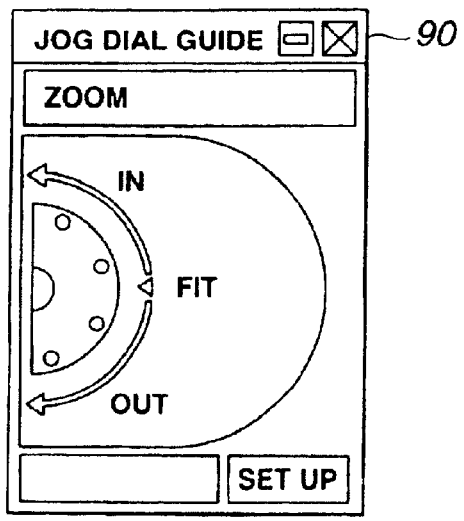
FIG. 35 illustrates a specified example of a jog dial window guiding state and the launcher state.

At step S33 of FIG. 16, it is checked whether or not there is any active application. The processing proceeds to the launcher operation or the event operation in the absence or in the presence of the active application, respectively. The flowchart of the launcher operation is shown in FIG. 34. A specified example of the window (user interface UI) during the launcher operation of the jog dial is shown at (b) in FIG. 35. At step S41 of FIG. 34, the launcher state UI is displayed on the window. At step S42, the list of applications launched responsive to the operation of the jog dial (vertical scrolling or thrusting) is displayed for startup. FIG. 36 shows the state of display of the jog dial window 90 on launcher operation on the window 100 directly after startup.

Figure 35B:
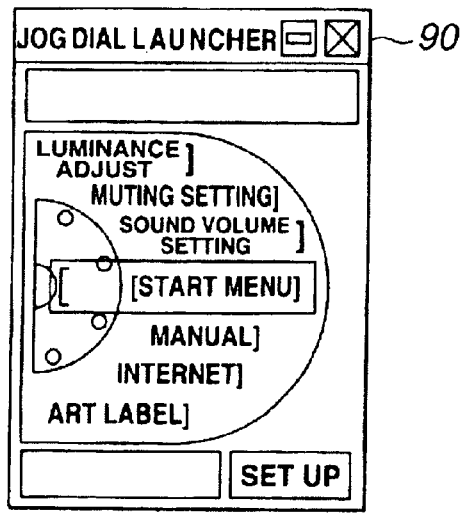
Figure 35C:
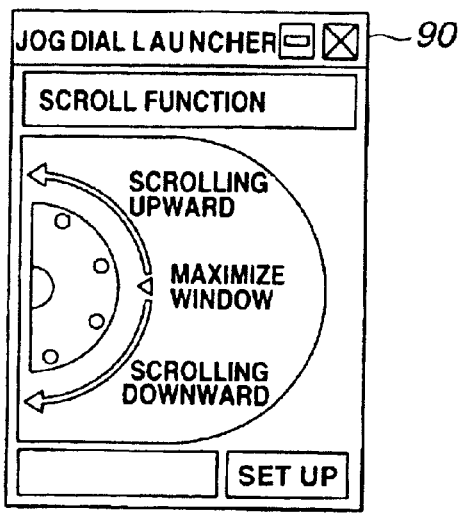
Figure 36:
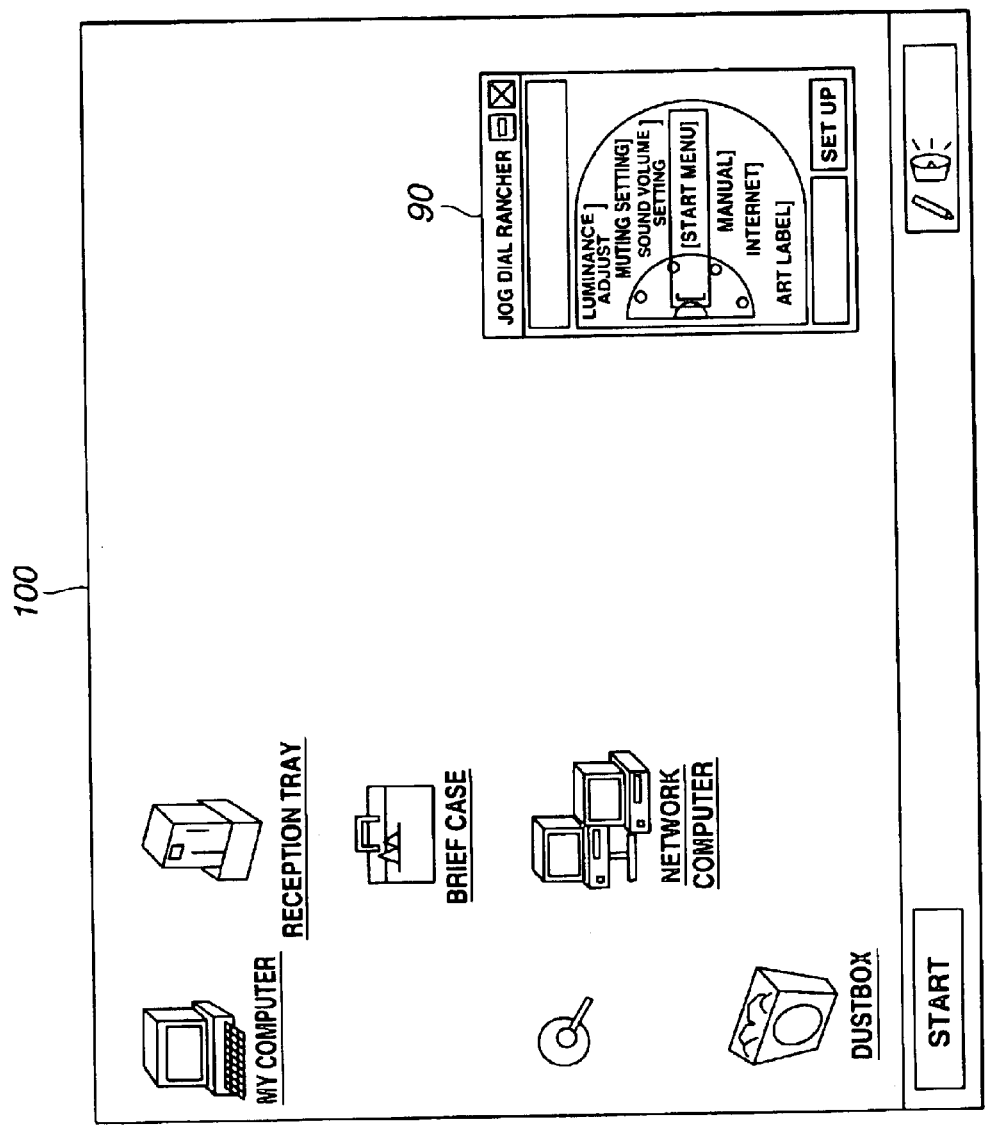
FIG. 36 illustrates a specified example of a jog dial window demonstrating the launcher state on a window directly after OS startup.

If the E-mail is selected with the display shown at (b) in FIG. 35, the processing as from step S94 of FIG. 32 is carried out at step S43.

Figure 37:
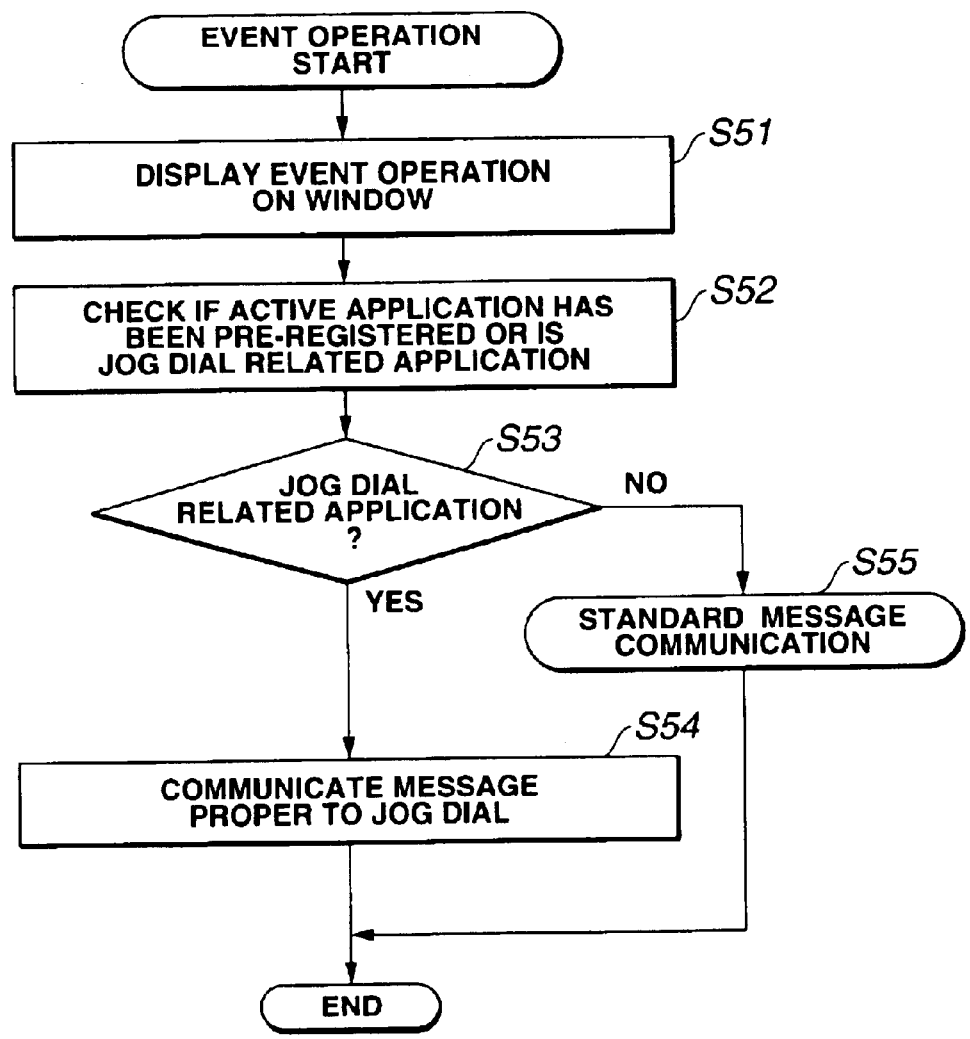
FIG. 37 is a flowchart for illustrating an event operation.

Should there be an active application at step S33 in FIG. 16, an event operation shown in FIG. 37 is carried out. The application may be classified into a jog dial related application and a jog dial non-related application, and the jog dial related application has been explained in detail. The distinction between the jog dial related application and the jog dial non-related application is made at steps S52 and S53. First, at step S51, the UI performing the event operation is displayed on the window.

At step S52, it is checked whether or not the active application is the pre-registered jog dial related application and a decision is given at step S53. If the application is determined at step S53 to be a jog dial related application, the program moves to step S54 to make jog dial proper message notice in accordance with the procedure shown in FIG. 14 to display the jog dial window 90 shown in FIGS. 26 and 35(a). If the application is determined at step S53 to be a jog dial non-related application, the program moves to step S55 to make standard message notice to display the jog dial window 90 shown for example in FIG. 30(c).

Figure 38:
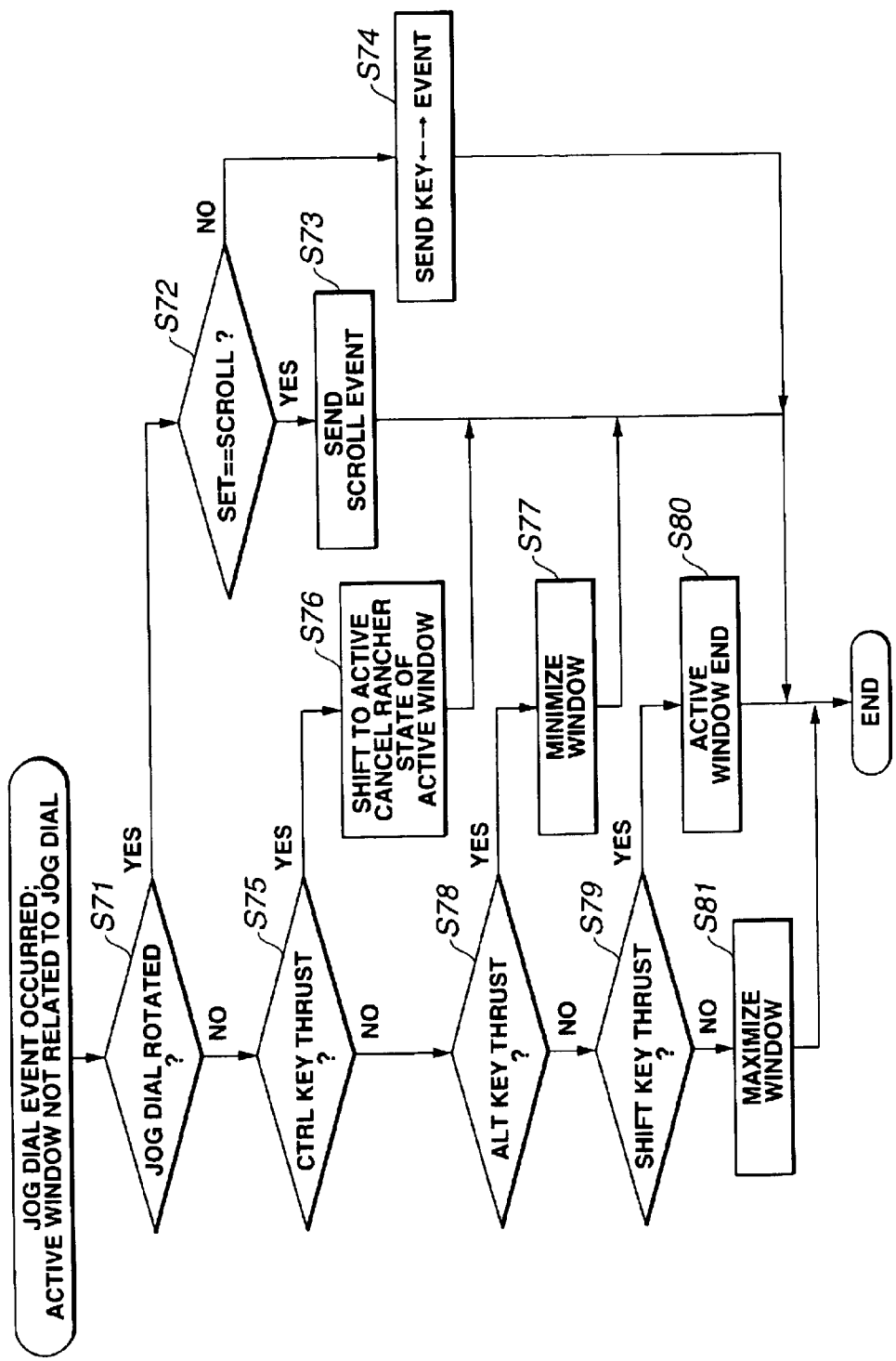
FIG. 38 is a flowchart for illustrating the jog dial non-accommodating application.

FIG. 38 shows the standard message notice at step S55, that is the event notifying procedure of the jog dial non-related application. At step S71, it is checked whether or not the jog dial has been rotated. If the result is affirmative, the program moves to step S72 to check whether or not the setting is that of the scrolling function. If the setting is that fort the scrolling function, the program moves to step S73 to send a scroll event. That is, the scrolling function is displayed on the jog dial window 90 as shown in FIG. 30(c) to guide the scrolling upward direction or the scrolling downward direction. The jog dial rotation gives the same operation as upward or downward scrolling of the scroll bar in the active window. If the setting at step S72 is not for scrolling, the program moves to step S74 to rotate the jog dial to emulate pressing down the⇔key. In these steps S73 and S74, it is possible to set the arrow key function and to make allocation to the scroll key on the jog dial setting screen as later explained.

If it is verified at step S74 that the jog dial has been pressed instead of being rotated, the program moves to step S75 to verify whether or not the control key (Ctrl key) has also been pressed. If is ir verified that the control key also has been pressed, the program moves to step S76 to cancel the active window to transfer to the launcher state described above. If it is determined at step S75 that the control key has not been pressed, the program moves to step S78 to check whether or not the Alt key has been pressed along with the jog dial. If the Alt key has been pressed, the program moves to step S77 to minimize the window.

If it is verified at step S78 that the Alt key has not been pressed, the program moves to step S79 to verify whether or not the shift key has been pressed along with the jog dial. If it is determined that the shift key has been pressed, the program moves to step S80 to terminate the active window. If it is determined at step S78 that the shift key has not been pressed down, the program moves to step S81 to maximize the window.

The above is the event notification processing of the jog dial when the jog dial non-related application is found to be active.

Figure 39:
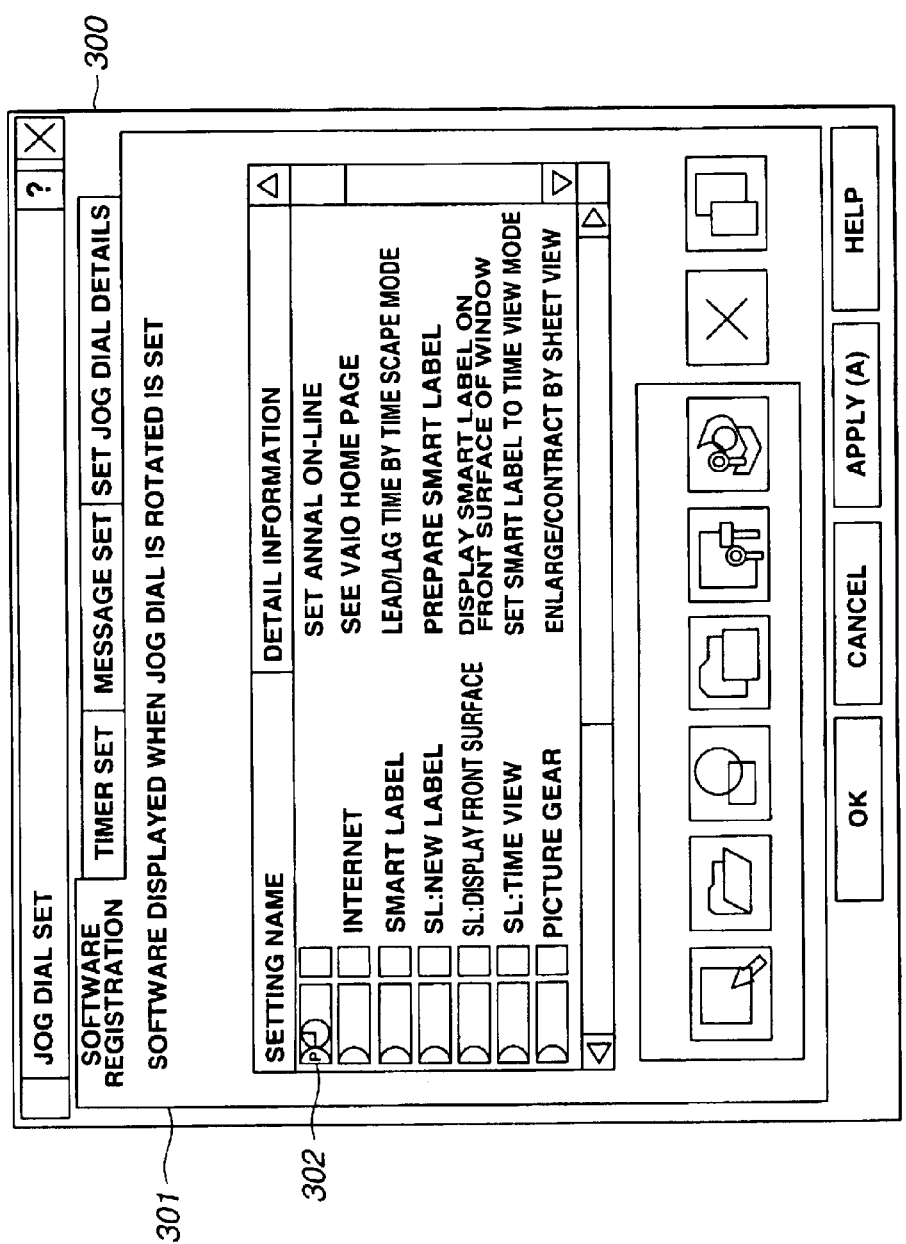
FIG. 39 illustrates the manner of registering an application on an application list adapted for starting in particular from the launcher function in setting the jog dial.

The setting of the jog dial is now explained. The actuation of the "set up" button of the jog dial window 90 provides for transfer to a jog dial setting screen 300 shown in FIG. 39. It is possible to register an application in an application list started from the launcher function. The registration is set by selecting a registration area 301 of the software and affixing a jog dial mark in a desired application. An OK button is then clicked to compete the registration setting. The startup application in the PKK function in the jog dial can also be registered in this registration area 301 by affixing P to the jog dial mark. In similar manner, the startup application in the automatic timer registration can also be registered by affixing a timepiece mark. At this time, such items as starting the start time setting only once or every week, transition to suspended hypernation after startup can be set.

Figure 40:
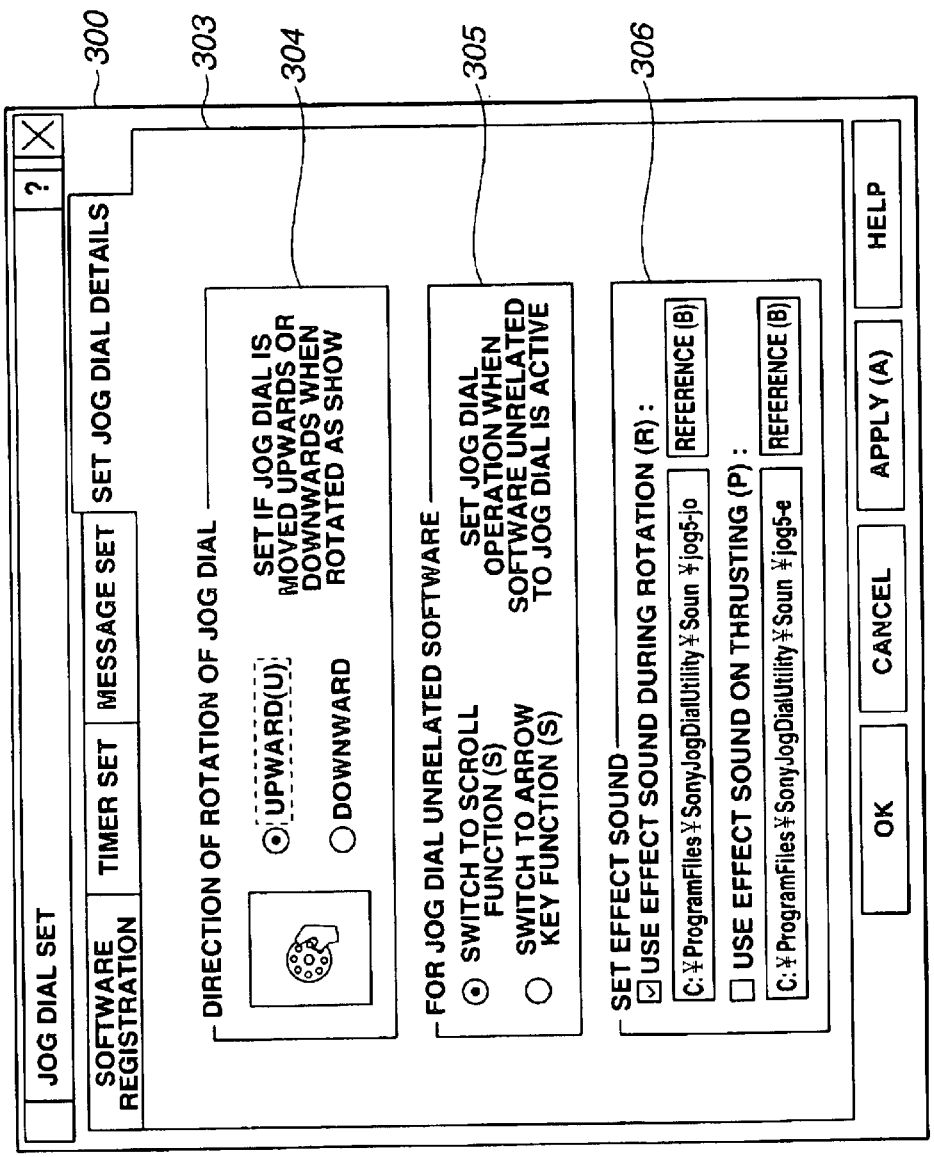
FIG. 40 illustrates the manner of optionally customizing function allocation for jog dial setting, in particular the jog dial; operation.

By a setting operation in the jog dial setting screen 300, function allocation associated with the jog dial actuation can be customized freely. This is explained with reference to FIG. 40.

First, the event sort corresponding to the direction of jog dial rotation is set. In the jog dial setting screen 300, a dial detail setting area 303 is selected and it is set whether the jog dial is to be operated upwards or downwards on jog dial rotation by a jog dial rotating direction setting unit 304.

The scrolling function and the arrow key function for the jog dial non-related application are then set. The dial detail setting area 303 of the jog dial setting screen 300 is selected and the jog dial operation when the jog dial non-related software has become active is set. Here, the "switching to the scrolling function" and "switching to the arrow key function" are selected.

The effect sound on jog dial actuation and the wave file of the jog dial sound then are set. The dial detail setting area 303 of the jog dial setting screen 300 is selected. It is selected whether or not the effect sound is to be used on jog dial rotation and, if the effect sound is to be used, the wave file is set. The appellation of the respective files can be referred to by clicking the reference button. Similarly, it is selected whether or not the effect sound is to be used on pressing the jog dial. If the effect sound is to be used, the wave file is set. Here again, the appellation of the respective files can be referred to by clicking the reference button.

The furnishing medium for furnishing the program for executing the above-described processing for the jog dial may be a recording medium, such as a magnetic disc, a CD-ROM or a solid-state memory, communication medium, such as network or satellite, or a variety of interfaces such as routers or modems transmitting or receiving programs furnished by these communication mediums. The medium in the meaning of the present invention is to be construed in the broad sense to comprise all of the mediums.

What is claimed is:

1. An information processing apparatus comprising:
    actuating means including a jog dial having a first actuating portion associated with a rotating operation and a second operating portion associated with movement actuation in one translational direction; and
    control means for monitoring the state of said actuating means and for executing a pre-set processing operation in meeting with each actuation;
    said control means switching an actuating window associated with said actuating means in at least two modes responsive to the state of an application program;
    wherein said two modes are a guide state mode showing a guide state of guiding the operation of an activated application program and a launcher state mode showing a launcher state launching an application program for selection in the absence of an activated application program;

wherein said guide state mode and said launcher state mode are operable for a number of application programs by using said jog dial and an input device and wherein said guide state mode and said launcher state mode are operable for a number of application programs by using only said jog dial; and wherein said jog dial has a one-touch actuating function to automatically cause a sequence of operations including startup of a pre-set application or a pre-set operation to commence from a power saving mode state by touching said jog dial only once.

2. The information processing apparatus according to claim 1 wherein, if the activated application program corresponds to said actuating means, said control means displays an operating guide proper to an application on said actuating window by a notification from said application program.

3. The information processing apparatus according to claim 1 wherein, if the activated application program does not correspond to said actuating means, said control means displays a previously set predetermined operation on said actuating window to execute an operation in agreement with said display.

4. An information processing method comprising:

a controlling step of monitoring the state of actuating means including a jog dial having a first actuating portion associated with a rotating operation and a second operating portion associated with movement actuation in one translational direction and for executing a pre-set processing operation in meeting with each actuation;

said control step switching an actuating window in at least two modes responsive to the state of an application program;

wherein said two modes are a guide state mode showing a guide state of guiding the operation of an activated application program and a launcher state mode showing a launcher state launching a application program for selection in the absence of an activated application program;

wherein said guide state mode and said launcher state mode are operable for a number of application programs by using said jog dial and an input device and wherein said guide state mode and said launcher state mode are operable for a number of application programs by using only said jog dial; and wherein said jog dial has a one-touch actuating function to automatically cause a sequence of operations including startup of a pre-set application or a pre-set operation to commence from a power saving mode state by touching said jog dial only once.

5. The information processing method according to claim 4 wherein, if the activated application program corresponds to said actuating means, said control step displays an operating guide proper to an application on said actuating window by a notification from said application program.

6. The information processing method according to claim 4 wherein, if the activated application program does not correspond to said actuating means, said control means displays a previously set predetermined operation on said actuating window to execute an operation in agreement with said display.

7. An information processing apparatus comprising:

actuating means including a jog dial being movable in a rotating direction and a translational direction; and control means for monitoring the state of said actuating means and for executing a pre-set processing operation in accordance with therewith, wherein said apparatus is operable in at least two modes including a guide state mode which causes a guide state for guiding an operation of an application program to be displayed on a display device and a launcher state mode which causes a desired application program to be launched, wherein said guide state mode and said launcher state mode are operable for a number of application programs by using said jog dial and an input device and wherein said guide state mode and said launcher state mode are accessible for a number of application programs by using only said jog dial; and wherein said jog dial has a one-touch actuating function to automatically cause a sequence of operations including startup of a pre-set application or a pre-set operation to commence from a power saving mode state by touching said jog dial only once.

8. A method for processing information obtained by use of a processing apparatus, said method comprising the steps of:

using an actuating means including a jog dial being movable in a rotating direction and a translational direction; and monitoring the state of said actuating means and executing a pre-set processing operation in accordance with therewith, wherein said two modes are a guide state mode which causes a guide state for guiding an operation of an application program to be displayed on a display device and a launcher state mode which causes a desired application program to be launched, wherein said guide state mode and said launcher state mode are operable for a number of application programs by using said jog dial and an input device and wherein said guide state mode and said launcher state mode are accessible for a number of application programs by using only said jog dial; and wherein said jog dial has a one-touch actuating function to automatically cause a sequence of operations including startup of a pre-set application or a pre-set operation to commence from a power saving mode state by touching said jog dial only once.

* * * * *